US007517074B2

(12) United States Patent
Hakamada et al.

(10) Patent No.: US 7,517,074 B2
(45) **Date of Patent: *Apr. 14, 2009**

(54) PRINTING MEDIUM COATING SOLUTION, INK-JET INK, IMAGE FORMING METHOD, SET OF PRINTING MEDIUM COATING SOLUTION AND INK-JET INK, AND INK-JET RECORDING APPARATUS

(75) Inventors: Shinichi Hakamada, Kawasaki (JP); Yasuhiro Nito, Yokohama (JP); Koromo Shirota, Kawasaki (JP); Kenji Shinjo, Yokohama (JP); Yutaka Kurabayashi, Higashi Murayama (JP); Tetsu Iwata, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 163 days.

This patent is subject to a terminal disclaimer.

(21) Appl. No.: 11/678,718

(22) Filed: Feb. 26, 2007

(65) Prior Publication Data

US 2007/0134451 A1 Jun. 14, 2007

Related U.S. Application Data

(60) Division of application No. 11/223,946, filed on Sep. 13, 2005, now Pat. No. 7,208,032, which is a continuation of application No. PCT/JP2005/005303, filed on Mar. 16, 2005.

(30) Foreign Application Priority Data

Mar. 16, 2004 (JP) ............................. 2004-075368
Mar. 16, 2004 (JP) ............................. 2004-075370
Mar. 10, 2005 (JP) ............................. 2005-068134

(51) Int. Cl.
*G01D 11/00* (2006.01)
*C09D 11/02* (2006.01)

(52) U.S. Cl. ...................... 347/100; 347/95; 106/31.27; 106/31.6

(58) Field of Classification Search ................... 347/95, 347/96, 100, 101, 105; 106/31.6, 31.27, 106/31.13; 523/160; 428/195, 32.1
See application file for complete search history.

(56) References Cited

U.S. PATENT DOCUMENTS 5,356,464 A 10/1994 Hickman et al. .............. 106/20

(Continued)

FOREIGN PATENT DOCUMENTS

JP 4-332775 11/1992

(Continued)

OTHER PUBLICATIONS

U.S. Appl. No. 11/550,473, filed Oct. 18, 2006, M. Udaga, et al., Pending.

(Continued)

*Primary Examiner*—Manish S Shah
(74) *Attorney, Agent, or Firm*—Fitzpatrick, Cella, Harper & Scinto

(57) ABSTRACT

The present invention can sufficiently suppress curling phenomenon of a recorded product and facilitate handling of a printed product produced by using plain paper, in particular. The present invention provides a printing medium coating solution including water and a water-retentive, water-soluble organic compound, wherein the water-soluble organic compound includes only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the printing medium coating solution. The present invention provides an ink-jet ink including a coloring material, water, and a water-retentive, water-soluble organic compound, wherein the water-soluble organic compound includes only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the ink-jet ink.

21 Claims, 5 Drawing Sheets

U.S. PATENT DOCUMENTS

| | | | | |
|---|---|---|---|---|
| 5,451,251 | A | 9/1995 | Mafune et al. | 106/31.48 |
| 5,580,373 | A | 12/1996 | Lane et al. | 106/20 |
| 5,620,793 | A | 4/1997 | Suzuki et al. | 428/342 |
| 5,782,967 | A | 7/1998 | Shirota et al. | 106/31.58 |
| 6,036,307 | A | 3/2000 | Hakamada et al. | 347/106 |
| 6,080,229 | A | 6/2000 | Watanabe et al. | 106/31.43 |
| 6,084,619 | A | 7/2000 | Takemoto et al. | 347/96 |
| 6,086,197 | A | 7/2000 | Kubota et al. | 347/96 |
| 6,188,850 | B1 | 2/2001 | Sakaki et al. | 399/1 |
| 6,214,963 | B1 | 4/2001 | Noguchi et al. | 528/71 |
| 6,221,141 | B1 | 4/2001 | Takada et al. | 106/31.6 |
| 6,247,804 | B1 | 6/2001 | Watanabe | 347/86 |
| 6,286,953 | B1 | 9/2001 | Takemoto et al. | 347/100 |
| 6,342,095 | B1 | 1/2002 | Takizawa et al. | 106/31.27 |
| 6,387,168 | B1 | 5/2002 | Koitagbashi et al. | 106/31.6 |
| 6,398,355 | B1 | 6/2002 | Shirota et al. | 347/100 |
| 6,435,658 | B1 | 8/2002 | Kato et al. | 347/43 |
| 6,474,803 | B1 | 11/2002 | Shirota et al. | 347/100 |
| 6,530,656 | B1 | 3/2003 | Teraoka et al. | 347/100 |
| 6,533,406 | B2 | 3/2003 | Katsuragi et al. | 347/96 |
| 6,538,047 | B1 | 3/2003 | Miyabayashi | 523/160 |
| 6,540,329 | B1 | 4/2003 | Kaneko et al. | 347/43 |
| 6,552,156 | B2 | 4/2003 | Noguchi et al. | 528/71 |
| 6,582,070 | B2 | 6/2003 | Takada et al. | |
| 6,676,254 | B2 | 1/2004 | Nagashima et al. | 347/100 |
| 6,698,876 | B2 | 3/2004 | Sato et al. | 347/100 |
| 6,706,104 | B2 | 3/2004 | Takuhara et al. | 106/31.6 |
| 6,706,105 | B2 | 3/2004 | Takada et al. | 106/31.6 |
| 6,723,137 | B1 | 4/2004 | Hakamada et al. | 8/549 |
| 6,848,781 | B2 | 2/2005 | Ogino et al. | 347/105 |
| 6,874,881 | B2 | 4/2005 | Suzuki et al. | 347/100 |
| 6,929,362 | B2 | 8/2005 | Takada et al. | 347/100 |
| 6,932,465 | B2 | 8/2005 | Nito et al. | 347/96 |
| 6,935,732 | B2 | 8/2005 | Takada et al. | 347/96 |
| 6,976,755 | B2 | 12/2005 | Sato et al. | 347/100 |
| 7,005,461 | B2 | 2/2006 | Sanada et al. | 523/160 |
| 7,008,977 | B2 | 3/2006 | Sakai et al. | 523/200 |
| 7,029,109 | B2 | 4/2006 | Shirota et al. | 347/100 |
| 7,055,943 | B2 | 6/2006 | Suzuki et al. | 347/100 |
| 7,208,032 | B2 * | 4/2007 | Hakamada et al. | 106/31.27 |
| 2004/0027404 | A1 | 2/2004 | Nagashima et al. | |
| 2004/0231554 | A1 | 11/2004 | Udagawa et al. | 106/31.15 |
| 2004/0244622 | A1 | 12/2004 | Ichinose et al. | 101/491 |
| 2005/0005818 | A1 | 1/2005 | Sato et al. | 106/31.27 |
| 2005/0007436 | A1 | 1/2005 | Ogino et al. | 347/105 |
| 2005/0088501 | A1 | 4/2005 | Nagashima et al. | 347/100 |
| 2005/0109952 | A1 | 5/2005 | Udagawa et al. | 250/461.1 |
| 2005/0195243 | A1 | 9/2005 | Nagashima et al. | 347/54 |
| 2005/0204955 | A1 | 9/2005 | Nagashima et al. | 106/31.59 |
| 2005/0219341 | A1 | 10/2005 | Nito et al. | 347/100 |
| 2006/0000386 | A1 | 1/2006 | Hakamada et al. | 106/31.13 |
| 2006/0007288 | A1 | 1/2006 | Takada et al. | 347/100 |
| 2006/0007289 | A1 | 1/2006 | Nito et al. | 347/100 |
| 2006/0009544 | A1 | 1/2006 | Miyagawa et al. | 523/160 |
| 2006/0012657 | A1 | 1/2006 | Nagashima et al. | 347/100 |
| 2006/0089424 | A1 | 4/2006 | Sanada et al. | 523/160 |
| 2006/0098067 | A1 | 5/2006 | Imai et al. | 347/100 |
| 2006/0098068 | A1 | 5/2006 | Hakamada et al. | 347/100 |
| 2006/0100311 | A1 | 5/2006 | Tokuda et al. | 523/160 |
| 2006/0103703 | A1 | 5/2006 | Nito et al. | 347/100 |
| 2006/0103704 | A1 | 5/2006 | Hakamada et al. | 347/100 |
| 2006/0124032 | A1 | 6/2006 | Ichinose et al. | 106/400 |
| 2006/0125895 | A1 | 6/2006 | Nito et al. | 347/100 |
| 2006/0125896 | A1 | 6/2006 | Aikawa et al. | 347/100 |
| 2006/0130706 | A1 | 6/2006 | Nakajima et al. | 106/499 |
| 2006/0135647 | A1 | 6/2006 | Ichinose et al. | 523/160 |
| 2006/0137569 | A1 | 6/2006 | Osumi et al. | 106/31.13 |
| 2006/0137570 | A1 | 6/2006 | Osumi et al. | 106/31.27 |
| 2006/0139428 | A1 | 6/2006 | Osumi et al. | 347/100 |
| 2006/0139429 | A1 | 6/2006 | Osumi et al. | 347/100 |
| 2006/0142416 | A1 | 6/2006 | Sakai et al. | 523/160 |
| 2006/0142417 | A1 | 6/2006 | Kaneko et al. | 523/160 |
| 2006/0152570 | A1 | 7/2006 | Ishikawa et al. | 347/106 |
| 2006/0192827 | A1 | 8/2006 | Takada et al. | 347/100 |
| 2006/0194056 | A1 | 8/2006 | Nagashima et al. | 428/403 |
| 2006/0194897 | A1 | 8/2006 | Kawabe et al. | 523/160 |
| 2006/0196389 | A1 | 9/2006 | Tsuji et al. | 106/31.43 |

FOREIGN PATENT DOCUMENTS

| | | |
|---|---|---|
| JP | 6-157955 | 6/1994 |
| JP | 6-240189 | 8/1994 |
| JP | 9-165539 | 6/1997 |
| JP | 9-176538 | 7/1997 |
| JP | 9-207424 | 8/1997 |
| JP | 9-234943 | 9/1997 |
| JP | 10-130550 | 5/1998 |
| JP | 10-195404 | 7/1998 |
| JP | 11-115303 | 4/1999 |
| JP | 2000-94825 | 4/2000 |
| JP | 2000-198267 | 7/2000 |
| JP | 2002-161223 | 6/2002 |
| JP | 2003-11486 | 1/2003 |
| JP | 2003-82265 | 3/2003 |
| JP | 2004-106297 | 4/2004 |
| JP | 2004-210906 | 7/2004 |

OTHER PUBLICATIONS

International Search Report and Written Opinion in PCT/JP2005/005303.

* cited by examiner

PRINTING MEDIUM COATING SOLUTION, INK-JET INK, IMAGE FORMING METHOD, SET OF PRINTING MEDIUM COATING SOLUTION AND INK-JET INK, AND INK-JET RECORDING APPARATUS

This application is a division of application Ser. No. 11/223,946 filed Sep. 13, 2005 now U.S. Pat. No. 7,208,032, which is a continuation of International Application No. PCT/JP2005/005303, filed Mar. 16, 2005, which claims the benefit of Japanese Patent Applications No. 2004-075368, filed Mar. 16, 2004, No. 2004-075370, filed Mar. 16, 2004, and No. 2005-068134, filed Mar. 10, 2005.

BACKGROUND OF THE INVENTION

1. Field of the Invention

The present invention relates to a printing medium coating solution to be partly or entirely applied onto a surface of a printing medium before or after an image is at least partly formed on the printing medium through an ink-jet recording method or the like. Further, the present invention relates to an ink-jet ink used for an ink-jet recording method including image recording through ink ejection. Further, the present invention relates to an image forming method for forming an image by using the printing medium coating solution and the ink-jet ink. Further, the present invention relates to a set of the printing medium coating solution and the ink-jet ink. Further, the present invention relates to an ink-jet recording apparatus equipped with the set of the printing medium coating solution and the ink-jet ink.

2. Related Background Art

The ink-jet recording method is a method allowing fine droplets of ink to fly and adhere onto a printing medium (such as paper) based on various operational principles for recording of an image or a letter. The ink-jet recording method has such a feature that the method allows high speed recording, produces little noise, facilitates multi-coloring, has high flexibility in recording patterns, and requires no developing or fixing, and therefore has rapidly spread in various applications. However, use of plain paper as a printing medium may cause a curling phenomenon including warping or curling of the paper. The curling phenomenon greatly results from provision of moisture. That is, it is known that provision of moisture over a large area and provision of a large amount of moisture cause a significant curling phenomenon.

Several methods have been heretofore proposed to reduce and suppress curling phenomenon. For example, there is proposed an ink-jet ink containing a solid substance having four or more hydroxyl groups in a molecular structure and capable of dissolving in water or an aqueous organic solvent (see JP 4-332775 A, for example). Further, there is proposed an ink containing an anti-curling agent such as sugars, sugar alcohols, or a specific amide compound (see JP 6-157955 A, JP 6-240189 A, JP 9-16539 A, and JP 9-176538 A, for example). Further, there is proposed an ink containing a specific polyalcohol and glycerin in combination (see JP 10-130550 A, for example). Further, there is proposed an ink containing a solvent, a polymer binder, a mordant, a water-soluble anti-curling agent compound, a water-soluble desizing compound, a light resistant compound, a defoaming agent, and the like (see JP 2000-19826 A, for example).

Further, there are proposed various methods for forming an image as a measure for forming an image through an ink-jet recording method including preparation of a liquid (coating solution) for forming a favorable image separately from a normal ink-jet ink as described above; and adherence of the liquid onto a printing medium before ink ejection. For example, there is proposed a recording method (hereinafter, referred to as a two-liquid system) including provision of a liquid composition containing polyvalent metal ions to a printing medium in advance; and subjecting the printing medium to printing by using an ink having reactivity with the liquid composition, to thereby attain improvement in image properties such as uniformity of image and image density (see JP 9-234943 A, JP 11-115303 A, and JP 2000-94825 A, for example).

SUMMARY OF THE INVENTION

Curling phenomenon can be suppressed to some extent by including into the ink a conventional compound capable of inhibiting curling phenomenon. However, a coating solution or an ink capable of improving ejection stability or reliability and further capable of reducing or suppressing the curling phenomenon more efficiently has been required recently for high-speed printing and high quality image. In particular, a system including application of a printing medium coating solution to the entire surface of a printing medium; conveyance of the printing medium in the recording apparatus; and subsequent provision of an ink to the printing medium, may cause curling phenomenon of the printing medium while the printing medium having the printing medium coating solution applied thereto is conveyed until the ink is provided thereto, to thereby cause failures in conveyance. Thus, the system involves the need of suppressing curling phenomenon to a greater extent than before.

Therefore, an object of the present invention is to provide a printing medium coating solution capable of reducing or suppressing, more effectively than before, curling phenomenon caused when a water-soluble component is applied to the printing medium.

Another object of the present invention is to provide an ink-jet ink capable of sufficiently suppressing curling phenomenon caused by leaving plain paper to stand after it is subjected to printing by using an ink-jet ink, and having excellent ejection stability inhibiting distortion or blur of a printed portion at a start of printing in a normal temperature and normal humidity environment.

Still another object of the present invention is to provide a printing medium coating solution containing polyvalent metal ions and having both curling phenomenon suppression effect and storage stability.

Yet another object of the present invention is to suppress curling phenomenon of a recorded product obtained through a two-liquid system including image formation by using a set of a printing medium coating solution and an ink-jet ink.

The above-described objects can be attained by the present invention. That is, the printing medium coating solution of the present invention is a printing medium coating solution including water and a water-retentive, water-soluble organic compound, wherein the water-soluble organic compound includes only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the printing medium coating solution.

Further, the ink-jet ink of the present invention is an ink-jet ink including a coloring material, water, and a water-retentive, water-soluble organic compound, wherein the water-soluble organic compound includes only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the ink-jet ink.

Further, the printing medium coating solution of the present invention is characterized in that it is used in combination with an ink.

Further, the printing medium coating solution and the ink-jet ink of the present invention are characterized in that they are used in an image forming method including the steps of providing a printing medium with the ink containing a coloring material in a dissolved or dispersed state; and providing the printing medium with the printing medium coating solution.

Further, the image forming method of the present invention is an image forming method including the steps of providing a printing medium with an ink; and providing the printing medium with a printing medium coating solution, wherein the ink is the above-described ink-jet ink; and the printing medium coating solution is the above-described printing medium coating solution.

Another aspect of the present invention includes a set of the printing medium coating solution of the present invention and the ink-jet ink of the present invention.

Still another aspect of the present invention includes an ink-jet recording apparatus employing the printing medium coating solution of the present invention and the ink-jet ink of the present invention.

In order to suppress curling phenomenon more efficiently after the ink is provided, the printing medium coating solution preferably contains polyvalent metal ions. Further, the ink-jet ink and the printing medium coating solution preferably satisfy the following condition.

Taking as (A) an absorbance at a maximum absorption in a visible region (at a wavelength of 550 nm when carbon black is used as a coloring material) of a mixture of 50 g of a 800-times diluted aqueous solution of the printing medium coating solution and 0.3 g of a 5-times diluted aqueous solution of the ink-jet ink has been filtered through a filter having a pore size of 0.2 μm 15 minutes after the preparation of the mixture, and as (B) an absorbance at a maximum absorption wavelength in the visible region of a mixture of 0.3 g of the 5-times diluted aqueous solution of the ink-jet ink and 50 g of purified water, (A) and (B) satisfy the following relationship:

$$(A)/(B)<0.85$$

However, when the printing medium coating solution contains polyvalent metal ions, the printing medium coating solution may change during storage to become incapable of obtaining high optical density or may provide different image qualities at a start of storage and after storage over time. Thus, when the printing medium coating solution contains polyvalent metal ions, the printing medium coating solution preferably further contains a conjugate base of a strong acid and a conjugate base of a weak acid providing a buffer action for the change in hydrogen ion concentration.

The present invention can provide a printing medium coating solution capable of suppressing occurrence of curling phenomenon when applied to a printing medium. Further, the present invention can sufficiently suppress curling phenomenon in ink-jet recording and facilitate handling of a printed product of plain paper, in particular. The present invention can provide an ink-jet ink ensuring recording stability in an ink-jet recording method at the same time. Further, even in a two-liquid system including conveyance of a printing medium provided with a printing medium coating solution in a recording apparatus; and provision of the ink to the printing medium, the present invention allows prevention of failures in conveyance of the printing medium provided with the printing medium coating solution and sufficient suppression of curling phenomenon of the printing medium after the ink is provided. Further, the present invention provides a printing medium coating solution having excellent storage stability and causing no problems in liquid contact properties with instrument members, even when the printing medium coating solution contains polyvalent metal ions. That is, the present invention can provide an image with high density, high color development, and high quality on a printing medium such as plain paper without strike through of a coloring material to the backside of a printed surface even by using a printing medium coating solution stored for a long period of time.

DESCRIPTION OF THE PREFERRED EMBODIMENTS

Hereinafter, the present invention will be described in more detail with reference to preferred embodiments.

[Water-retentive, Water-soluble Organic Compound]

Curling phenomenon of plain paper after a liquid medium containing water is applied thereto presumably has some correlation with evaporation of moisture provided to the plain paper. The inventors of the present invention have conducted the following detailed studies on water retention ability of usual water-soluble organic compounds often used for an ink-jet ink or a coating solution.

First, 20 mass % aqueous solutions of various water-soluble organic compounds were prepared. 10 g of each aqueous solution was weighed and poured into a glass dish and was left standing in an environment of a temperature of 23° C. and a humidity of 45%. At the same time, purified water containing no water-soluble organic compound was left standing in the same manner. The amount of the solution in each dish reduced with evaporation of moisture to a constant mass. The entire purified water had evaporated by this time in the dish containing only purified water and left standing at the same time. Thus, the water-soluble organic compound and moisture retained thereby presumably remain in the dish containing the water-soluble organic compound, and the water retention ability of each compound was calculated from the following equation.

$$\text{Water retention ability \%} = \frac{(\text{Mass of remaining substance (g)}) - (\text{Mass of water} - \text{soluble compound (g)})}{(\text{Mass of water} - \text{soluble compound (g)})}$$

Figure 8:
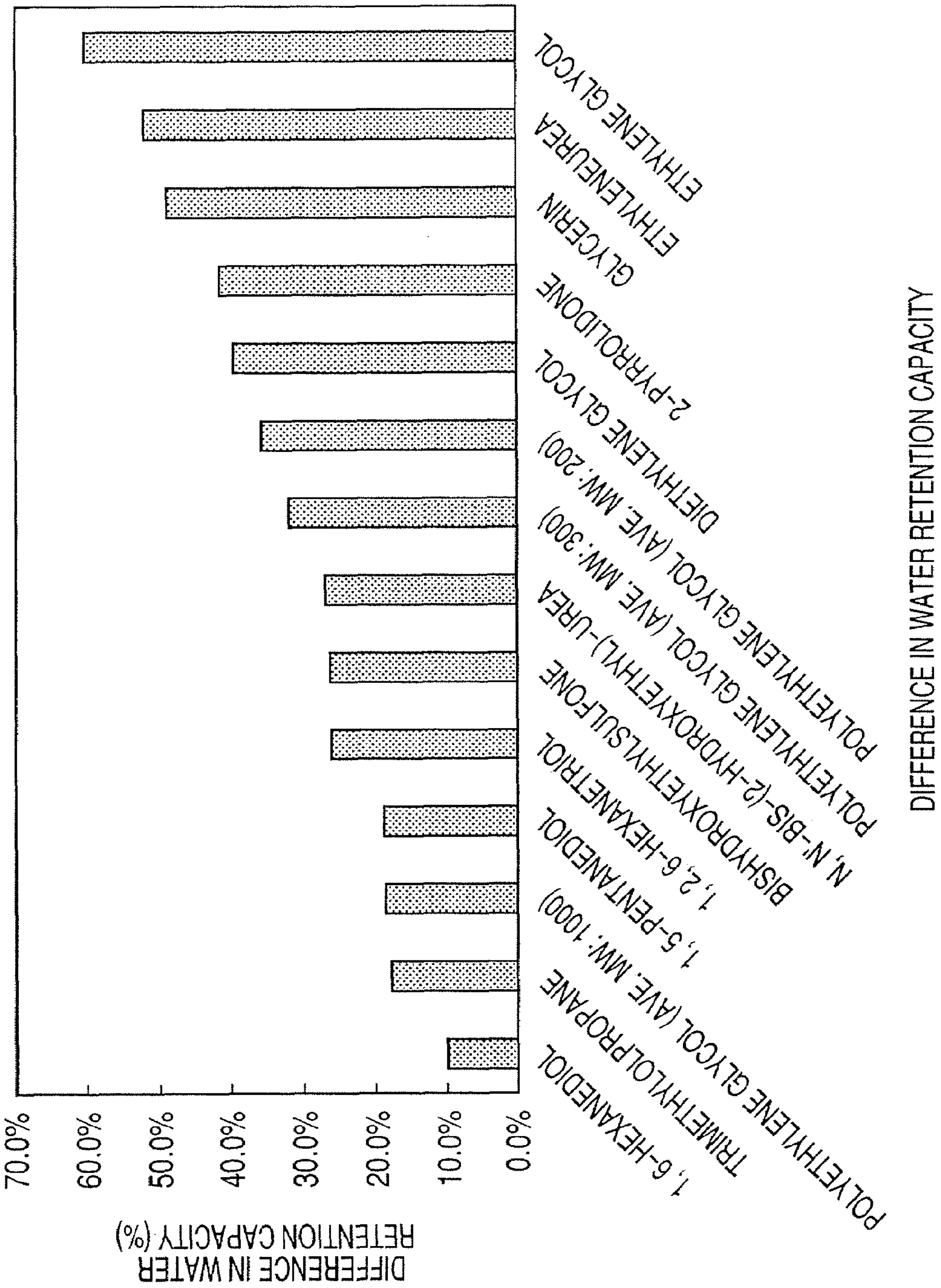
FIG. 8 is a diagram showing difference in water retention abilities of the water-soluble organic compounds.

Next, for each water-soluble compound, the same dish was transferred to an environment of a temperature of 30° C. and a humidity of 80% and was left standing in the same manner until equilibrium was attained. The mass of the remaining substance in this environment was measured, and the water retention ability was determined from the above equation. Further, the same dish was returned to an environment of a temperature of 23° C. and a humidity of 45%. The mass of the remaining substance was measured, and the water retention ability was determined in the same manner as described above. Table 7 shows the obtained results. FIG. 8 shows the difference in the water retention abilities in the two environments for each compound.

The inventors of the present invention have considered that there must be some correlation between the difference in the water retention abilities in the environments as described above and occurrence of curling phenomenon of plain paper. Thus, the inventors of the present invention have conducted studies on occurrence of curling phenomenon by applying an aqueous solution containing the water-soluble organic compounds as studied above to plain paper, and have found that a water-soluble organic compound showing a difference of 36% or less between the water retention ability at a temperature of 23° C. and a humidity of 45% and the water retention ability at a temperature of 30° C. and a humidity of 80% can significantly suppress curling phenomenon. Further, the inventors of the present invention have prepared an ink only containing a coloring material, additives, and the water-soluble organic compounds, and have examined occurrence of curling phenomenon. The results confirmed that curling phenomenon did not occur even after plain paper was subjected to printing and left standing for several days in normal temperatures. Thus, the inventors have completed the present invention.

Curling phenomenon of plain paper after printing presumably occurs as described below. Once moisture provided by printing enters into a hydrogen bond between fibers, the moisture transfers through evaporation or the like, and the tension initially applied alleviates at the same time, to thereby shrink a printed region alone. The water-soluble organic compound showing a hardly changing water retention ability presumably retains a constant amount of water stably. The retained water hardly transfers with its evaporation or the like, and thus occurrence of curling phenomenon is presumably suppressed.

The inventors of the present invention have conducted more detailed studies, and have observed the phenomenon that a water-soluble organic compound showing the difference in water retention ability of 17.5% or more suppresses curling phenomenon of a printed product over a longer period of time. The water-soluble organic compound showing the difference in water retention ability of 17.5% or more presumably has a weak hydrogen bonding force. Thus, moisture enters into a hydrogen bond between cellulose of paper but gradually transfers through migration.

The water-retentive, water-soluble organic compound in the present invention refers to a water-soluble organic compound having a water retention ability of 5% or more, preferably a water-soluble organic compound having a water retention ability of 6% or more and 23% or less in an environment of a temperature of 23° C. and a humidity of 45% from the viewpoint of a curling phenomenon suppression effect.

According to the present invention, a printing medium coating solution preferably contains only a water-soluble organic compound showing a difference of 36% or less between the water retention ability at a temperature of 23° C. and a humidity of 45% and the water retention ability at a temperature of 30° C. and a humidity of 80%, to thereby provide the curling suppression effect of the present invention. Specific examples of the water-soluble organic compound include a polyalcohol having an amide bond; polyethylene glycol having a molecular weight of 200 to 300; N,N'-bis-(2-hydroxylethyl)-urea; bishydroxyethyl sulfone ; 1,2,6-hexanetriol; 1,5-pentanediol; and trimethylolpropane. Of those, polyethylene glycol having a molecular weight of 200, trimethylolpropane, and N,N'-bis-(2-hydroxylethyl)-urea are preferable.

The present invention has such a feature that a solvent or humectant constituting a printing medium coating solution or ink-jet ink contains only a water-retentive, water-soluble organic compound as described above, to thereby allow more efficient suppression of curling phenomenon compared with that of a conventional coating solution or ink. Further, when an image is formed using a set of a printing medium coating solution and an ink in combination, the printing medium coating solution and the ink-jet ink of the present invention are used, to thereby allow more efficient suppression of curling phenomenon compared with that of a conventional ink set.

[Printing Medium Coating Solution]

The components, physical properties, application method on a printing medium, and application amount of the printing medium coating solution of the present invention will be described in detail.

(Components)

The printing medium coating solution of the present invention may contain an inorganic compound such as a polyvalent metal salt, in addition to the water-retentive, water-soluble organic compound showing a difference of 36% or less between the water retention ability at a temperature of 23° C. and a humidity of 45% and the water retention ability at a temperature of 30° C. and a humidity of 80%. When the printing medium coating solution contains polyvalent metal ions, after a printing medium is provided with an ink containing a coloring material in a dissolved or dispersed state, the printing medium coating solution and the ink are brought into contact with each other to destabilize the dissolved or dispersed state of the coloring material in the ink. Thus, favorable fixability of the coloring material can be obtained, and curling phenomenon of the thus-obtained recorded product can be suppressed more efficiently.

(Water-retentive, Water-soluble Organic Compound)

The water-retentive, water-soluble organic compound in the printing medium coating solution includes only a water-soluble organic compound showing a difference of 36% or less between the water retention ability at a temperature of 23° C. and a humidity of 45% and the water retention ability at a temperature of 30° C. and a humidity of 80%, to thereby provide the curling phenomenon suppression effect of the present invention. Specific examples of the water-soluble organic compound include a polyalcohol having an amide bond; polyethylene glycol having a molecular weight of 200 to 300; N,N'-bis-(2-hydroxylethyl)-urea; bishydroxyethyl sulfone; 1,2,6-hexanetriol; 1,5-pentanediol; and trimethylolpropane. Of those, polyethylene glycol having a molecular weight of 200, trimethylolpropane, and N,N'-bis-(2-hydroxylethyl)-urea are preferable.

The printing medium coating solution may contain a specified amount of any of the water-soluble organic compounds as described above, to thereby allow sufficient suppression of curling phenomenon. However, when the printing medium coating solution of the present invention is applied to a recording medium by means for operating employing an ink-jet system or means for transferring the printing medium coating solution by using a plurality of rollers, at least one type of the water-soluble organic compounds is preferably a liquid in normal temperatures (25° C.) in consideration of fixing thereof in the ink-jet head part or between the rollers with evaporation of the printing medium coating solution. Further, the printing medium coating solution more preferably contains trimethylolpropane having high water-retentive properties and polyethylene glycol having a relatively low viscosity and a low molecular weight in combination.

(Polyvalent Metal Ions and Salts thereof)

Specific examples of preferable polyvalent metal ions that can be used for the printing medium coating solution of the present invention include but are not limited to divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Al^{3+}$, $Fe^{3+}$, $Cr^{3+}$, and $Y^{3+}$. A polyvalent metal salt is used to incorporate the polyvalent metal ions into the printing medium coating solution. The salt refers to a metal salt including the polyvalent metal ions as described above and anions bonding with the ions, but must be soluble in water. A conjugate base of a strong acid is an example of a preferable anion for forming a salt from the viewpoint of solubility. Examples of the conjugate base of a strong acid include $NO_3^-$, $SO_4^{2-}$, and $Cl^-$, which are conjugate bases of strong acids of nitric acid, sulfuric acid, and hydrochloric acid. In particular, $NO_3^-$ has excellent solubility in water and is preferable.

Further, the inventors of the present invention have found that a salt of a strong acid containing metal ions with a high ability of destabilizing the components in the ink tends to cause pH reduction. The inventors of the present invention have conducted studies on nitrates of polyvalent metal ions by using a 4 mass % aqueous solution of carbon black dispersion (dispersant styrene-acrylic acid, acid value of 200, mass % of dispersant/mass % of pigment=0.2). The nitrates of the polyvalent metal ions had higher ability of destabilizing the components in the ink in the order of $Fe^{3+}$, $Y^{3+}$, $Al^{3+}$>$Cu^{2+}$, $Ca^{2+}$>$Mg^{2+}$, $Sr^{2+}$. A pH reduction occurred easily in the same order. When the salt of the polyvalent metal ion and strong acid is used, the printing medium coating solution preferably has metal ion concentrations of 0.2 mass % or more for $Fe^{3+}$, $Al^{3+}$, or $Y^{3+}$, 0.5 mass % or more for $Ca^{2+}$ or $Cu^{2+}$, or 1 mass % or more for $Mg^{2+}$ or $Sr^{2+}$ from the viewpoint of reactivity with the ink.

When a salt with $Mg^{2+}$ or $Sr^{2+}$ having a relatively low ability of destabilizing the ink is used to obtain a comparable ability as that of $Fe^{3+}$, $Al^{3+}$, or $Y^{3+}$ salt having higher ability, the pH of the printing medium coating solution tends to decrease with time.

In the present invention, $Ca^{2+}$, $Mg^{2+}$, $Sr^{2+}$, $Al^{3+}$, and $Y^{3+}$ are particularly preferable polyvalent metal ions, and $Ca^{2+}$ is especially preferable from the viewpoints of reactivity, coloring properties, and easy handling.

The content of polyvalent metal ions in the printing medium coating solution is preferably 0.01% or more and 10 mass % or less, more preferably 1 mass % or more and 5 mass % or less with respect to the total amount of the printing medium coating solution. The content is furthermore preferably 2 mass % or more and 4 mass % or less with respect to the total amount of the printing medium coating solution for sufficiently exerting a function of destabilizing the ink and obtaining uniformity of image and optical density at high levels. The printing medium coating solution may contain 10 mass % or more of polyvalent metal ions. However, the printing medium coating solution usually does not contain an excess amount of the polyvalent metal ions for the reasons such that significant enhancement in the function of destabilizing the ink cannot be expected with a content of more than 10%.

(Factors for Change by Storage)

However, the inventors of the present invention have noted that when the printing medium coating solution contains the polyvalent metal ions, the printing medium coating solution changes by storage, to thereby inhibit high optical density or provide different image quality at a start of storage and after storage over time. The factors causing such a phenomenon are assumed as described below.

Acid groups such as carboxyl groups generated through oxidation of an organic compound in the printing medium coating solution and polyvalent metal ions react with each other, and counter ions of the polyvalent metal ions (polyvalent metal anions) and protons of the acid groups produce acid, to thereby reduce the pH of the printing medium coating solution. The pH change causes change in reactivity of the printing medium coating solution, to thereby change image quality to be obtained. For example, reduction in reactivity of the printing medium coating solution causes permeation of a coloring material into the printing medium, to thereby inhibit high optical density or allow the coloring material to reach the vicinity of the backside of the printing medium (so-called a strike through phenomenon of the coloring material).

When the printing medium coating solution contains the polyvalent metal ions, a conjugate base of a strong acid and a conjugate base of a weak acid providing a buffer action in accordance with change in hydrogen ion concentration are further included in the printing medium coating solution. Thus, the printing medium coating solution can be provided with the buffer action, and the pH reduction can be suppressed to minimum. In addition, metal ions derived from a buffer used for providing the buffer action contributes to destabilization of the coloring material, to thereby provide high optical density that cannot be obtained by simple use of the polyvalent metal ions. Note that, the pH in the present invention refers to a value measured through a normal method at 25° C.

(Conjugate Base of Weak Acid)

The phrase "buffer action in accordance with change in hydrogen ion concentration" in the present invention means that when 1.0 mL of a 0.1 N aqueous solution of nitric acid is added to 50 mL of the printing medium coating solution, the change in hydrogen ion concentration before and after the addition of the aqueous solution of nitric acid is controlled to $1\times10^{-4}$ or less (hereinafter, referred to as "buffer action"). The change in hydrogen ion concentration can be calculated from pH change, and can be calculated from the following equation (hereinafter, referred to as "change in hydrogen ion concentration"):

$$\text{Change in hydrogen ion concentration (mol/L)}=(10^{-b})-(10^{-a})$$

wherein, a represents an initial pH and b represents a pH after addition of aqueous solution of nitric acid.

In the present invention, the printing medium coating solution contains a conjugate base of a weak acid for obtaining the buffer action. Specific examples of a preferable conjugate base of a weak acid include acetate ion, phosphate ion, carbonate ion, and phthalate ion. Alternatively, a salt of a weak acid may be added instead of the conjugate base of a weak acid. Examples of the salt of a weak acid include acetates such as sodium acetate, potassium acetate, and lithium acetate; hydrogen phosphates; hydrogen carbonates; and hydrogen salts of polycarboxylic acids such as sodium hydrogen phthalate, and potassium hydrogen phthalate. Specific examples of the polycarboxylic acid further include malonic acid, maleic acid, succinic acid, fumaric acid, itaconic acid, isophthalic acid, terephthalic acid, adipic acid, sebacic acid, dimer acid, pyromellitic acid, and trimellitic acid, in addition to phthalic acid.

(Physical Properties)

The physical properties and application conditions of the printing medium coating solution are not particularly limited. However, when the printing medium coating solution is used as the printing medium coating solution for a two-liquid system where a printing medium coating solution containing polyvalent metal ions is brought into contact with an ink to destabilize a dissolved or dispersed state of a coloring material in the ink, the physical properties of the printing medium coating solution are preferably specified as described below for further suppressing curling phenomenon of the printed product to be obtained.

The inventors of the present invention have conducted studies on the printing medium coating solution for a two-liquid system employing a printing medium coating solution, an ink containing a coloring material in a dissolved or dispersed state in an aqueous medium, and a liquid composition containing polyvalent metal ions for destabilizing the dissolved or dispersed state of the coloring material in the ink by becoming in contact with the ink. As a result, the inventors of the present invention have found that the extent of curling phenomenon of the recorded product obtained through the two-liquid system is alleviated in the presence of large amounts of coloring material aggregates in a surface layer of the printing medium.

The conditions for allowing the presence of aggregates at positions slightly permeated in the depth direction from the surface of the printing medium coating solution can be attained by controlling the reactivity of the printing medium coating solution with the ink. Further, it is important that the polyvalent metal ions be present in sufficient amounts for aggregation of the coloring material within about 30 μm from the surface of the printing medium. The amounts of the polyvalent metal ions in the printing medium coating solution and the permeability and application amount of the printing medium coating solution to the printing medium presumably and greatly participate in the presence of large amounts of polyvalent metal ions in the printing medium coating solution within about 30 μm from the surface of the printing medium.

The printing medium coating solution is brought into contact with the printing medium and permeates along fibers of the printing medium under the influence of a solvent, a surfactant, or the like at the same time. At the time of permeation, evaporation of a permeated liquid begins, and the polyvalent metal that has lost solubility begins to precipitate partly. That is, the permeation of the liquid into the printing medium and evaporation thereof are accelerated with the small application amount and high reactivity of the printing medium coating solution. As a result, large amounts of polyvalent metal ions can remain at positions slightly permeated in the depth direction from the surface of the printing medium.

As described above, in order to secure more efficient permeability of the printing medium coating solution of the present invention containing polyvalent metal ions into plain paper, the printing medium coating solution preferably has a Ka value obtained through the Bristow method of $1.3\ mL\cdot m^{31\ 2}\cdot msec^{-1/2}$ or more, and an application amount of $0.5\ g/m^2$ or more and $5\ g/m^2$ or less. Further, the printing medium coating solution more preferably has a Ka value of $3.0\ mL\cdot m^{-2}\cdot msec^{-1/2}$ or more, and an application amount of $2.0\ g/m^2$ or more and $3.0\ g/m^2$ or less.

Further, the printing medium coating solution preferably has a pH of 2 or more. A pH of less than 2 is not preferable because components of the printing medium coating solution may corrode the surfaces of members such as a tank and rollers and components of the members may elute into the printing medium coating solution, to thereby provide adverse effects on an image. The pH of the printing medium coating solution is maintained within a range of preferably 2 or more and 7 or less, more preferably 3 or more and 6 or less. The printing medium coating solution having a pH within the above range allows the presence of the polyvalent metal ions therein more stably, to thereby sufficiently secure the reactivity of the printing medium coating solution and provide sufficient buffer action. Thus, long-term storage stability of the printing medium coating solution can be maintained.

Further, the printing medium coating solution preferably has a pH lower than that of the ink from the viewpoints of efficient and easy reaction of the ink and the printing medium coating solution, and the solid uniformity and strike through properties of the printed product.

(Application Method and Application Amount to Printing Medium)

Next, the method of applying the printing medium coating solution of the present invention to the printing medium will be described in detail. Examples of the method of applying the printing medium coating solution to the printing medium include application methods through roller coating, bar coating, and spray coating. Another possible application method involves selective adhesion of the printing medium coating solution to an image forming region where the ink adheres and to the vicinity of the image forming region by using an ink-jet recording method as with ink.

The inventors of the present invention have conducted studies on several methods of providing the printing medium coating solution to a printing medium as described above. As a result, the inventors of the present invention have found that roller coating is the best method when a printing medium coating solution for a two-liquid system containing reactive agents such as polyvalent metal ions is used as the printing medium coating solution. This is because roller coating can provide a uniform distribution state of polyvalent metal ions which are reaction components in the vicinity of the surface layer of the printing surface, even in a particularly small application amount, compared with other means. Further, roller coating can provide an excellent image without unevenness after the ink is provided.

However, when a conventional coating solution is applied to a printing medium through roller coating, the liquid is provided to a large region of the printing medium, to thereby cause a curling phenomenon very easily. Further, in a two-liquid system involving application of a conventional coating solution to the entire surface of a printing medium; conveyance of the printing medium in a recording apparatus; and provision of an ink to the printing medium, the printing medium may become jammed while the printing medium is conveyed in the recording apparatus.

The inventors of the present invention have conducted further studies aiming at sufficiently suppressing the curling phenomenon even with a small application amount of the printing medium coating solution. The inventors of the present invention have found that the printing medium coating solution of the present invention preferably includes water; and a water-retentive, water-soluble organic compound, wherein the water-soluble organic compound shows a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the printing medium coating solution.

The curling phenomenon can be suppressed to some extent with a very large application amount of the printing medium coating solution to the printing medium even when the content of the water-soluble organic compound is 15 mass % or less with respect to the total amount of the printing medium coating solution. However, when the printing medium coating solution is applied to the printing medium before the ink is applied thereto or after the ink is applied thereto, the application amount of the printing medium coating solution must be reduced in consideration of fixability or the like of printed regions after the ink is provided. In this way, even when a small amount such as 3 $g/m^2$ or less of the printing medium coating solution is applied to the printing medium, the content of the water-soluble organic compound must be 15 mass % or more with respect to the total amount of the printing medium coating solution for obtaining a sufficient curling phenomenon suppression effect.

In addition, the inventors of the present invention have found that the curling phenomenon suppression effect develops efficiently with a water content of 77 mass % or less with respect to the total amount of the printing medium coating solution.

(Other Components)

The components used for the printing medium coating solution may include a surfactant, a defoaming agent, an antiseptic, and a fungicide, in addition to the components such as water, polyvalent metal ions, and a water-soluble compound having water-retaining properties within a range providing effects of the addition and without inhibiting the intended effects of the present invention for providing a printing medium coating solution with desired physical properties.

[Ink-jet Ink]

The components of the ink-jet ink of the present invention will be described in detail.

(Components)

The ink of the present invention may include a coloring material and water, in addition to the water-retentive, water-soluble organic compound. Further, the ink of the present invention may include a surfactant, a defoaming agent, an antiseptic, and a fungicide as required for providing a printing medium coating solution with the desired physical properties. The coloring material may be selected from a water-soluble dye, a water dispersed pigment (a microencapsulated pigment, a colored resin, and the like fall under the category of pigment in the present invention), and a combination of two or more types thereof. The amount of the coloring material is not particularly limited, but is preferably 0.1 mass % or more and 10 mass % or less in the ink, and the amount of the water dispersed pigment is preferably 0.1 mass % or more and 20 mass % or less in the ink including the resin used for dispersion for adjusting physical properties such as a viscosity. Hereinafter, the coloring material will be described in detail.

(Water-retentive, Water-soluble Organic Compound)

The ink-jet ink of the present invention includes a water-soluble organic compound showing a difference of 36% or less between the water retention ability at a temperature of 23° C. and a humidity of 45% and the water retention ability at a temperature of 30° C. and a humidity of 80% for suppressing curling phenomenon more efficiently than conventional ink-jet inks. In particular, preferable examples of the water-soluble organic compound in the ink include a polyalcohol having a molecular weight (Mw) within the range of $100 \leqq Mw \leqq 1,000$ and an amide bond; polyethylene glycol having a molecular weight of 200 to 300; N,N'-bis-(2-hydroxylethyl)-urea; bishydroxyethyl sulfone; 1,2,6-hexanetriol; 1,5-pentanediol; and trimethylolpropane for attaining performance as the ink-jet ink. Of those, N,N'-bis-(2-hydroxylethyl)-urea is particularly preferable.

The molecular weight of the water-soluble organic compound having a distribution such as that of a polyalcohol having an amide bond or polyethylene glycol was determined as average molecular weight through any method described below.

(1) Mass spectrum measurement, gas chromatography-mass spectrometry (GC-MS), and liquid chromatography-mass spectrometry (LC-MS) were conducted in accordance with JIS K0118 and JIS K0123 in JIS Handbook Chemical Analysis, to thereby measure the molecular weight.

(2) The average molecular weight of polyethylene glycol having a molecular weight distribution was determined by size exclusion chromatography (GPC) in accordance with JIS K0124 in JIS Handbook Chemical Analysis, to thereby obtain the molecular weight.

(3) The structure of the compound was specified, and the molecular weight was determined.

The water-soluble compound can be used alone or in combination with two or more types thereof. In the present invention, an organic solvent such as urea or glycerin generally used for providing the ink with properties as the ink-jet ink is not used because the water-retentive, water-soluble organic compound is used for suppression of curling phenomenon. Thus, when the ink-jet ink of the present invention is used for an ink-jet recording apparatus, the ink-jet ink preferably has a structure capable of ensuring ejection stability or suppressing clogging of a nozzle.

The inventors of the present invention have conducted further studies on this point and have found that an ink containing at least one water-soluble compound showing the change in water retention ability of 36% or less selected from a polyalcohol having a molecular weight (Mw) within the range of $100 \leqq Mw \leqq 1,000$ and an amide bond, N,N'-bis-(2-hydroxylethyl)-urea, and bishydroxyethyl sulfone, preferably two or more types thereof combined, more preferably three or more types thereof combined can be sufficiently used for an ink-jet head of small liquid drops and high speed. Of the polyalcohol having a molecular weight (Mw) within a range of $100 \leqq Mw \leqq 1,000$ and an amide bond, one water-soluble compound of the two or three types thereof combined is most preferably N,N'-bis-(2-hydroxylethyl)-urea. The reason is because N,N'-bis-(2-hydroxyethyl)-urea serves to prevent association due to a structure similar to that of urea, to thereby presumably prevent association with other water-soluble compounds and easily allow performance such as prevention of clogging or dye solubility.

(Coloring Material)

Examples of the coloring material used for the ink of the present invention include pigments such as carbon black and organic pigments. One type of pigment may be used or two or more types thereof may be used in combination. Examples of a form of the pigment include a pigment dispersed with a dispersant, a self-dispersing pigment, and colored fine particles/microcapsules. Hereinafter, the coloring material will be described in detail.

Carbon Black

Specific examples of carbon black include carbon black pigments such as furnace black, lamp black, acetylene black, and channel black. Examples of carbon black pigments include Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (all available from Columbian Chemicals Co.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Vulcan XC-72R (all available from Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all available from Degussa Corporation); and No. 25, No. 33, No. 40, No. 47, No. 52, No. 900, No. 2300, MCF-88, MA600, MA7, MA8, and MA100 (all available from Mitsubishi Chemical Corporation). Carbon black is not limited to the above and any conventionally known carbon black may be used. Magnetic fine particles (such as magnetite and ferrite), titanium black, or the like may be used as the black pigment.

Organic Pigments

Specific examples of the organic pigments include insoluble azo pigments such as toluidine red, toluidine maroon, Hansa yellow, benzidine yellow, and pyrazolone red; soluble azo pigments such as lithol red, helio bordeaux, pigment scarlet, and permanent red 2B; derivatives of vat dyes such as alizarin, indanthrone, and thioindigo maroon; phthalocyanine pigments such as phthalocyanine blue and phthalocyanine green; quinacridone pigments such as quinacridone red and quinacridone magenta; perylene pigments such as perylene red and perylene scarlet; isoindolinone pigments such as isoindolinone yellow and isoindolinone orange; imidazolone pigments such as benzimidazolone yellow, benzimidazolone orange, and benzimidazolone red; pyranthrone pigments such as pyranthrone red and pyranthrone orange; thioindigo pigments; condensed azo pigments; thioindigo pigments; and other pigments such as flavanthrone yellow, acylamide yellow, quinophthalone yellow, nickel azo yellow, copper azo methine yellow, perinone orange, anthrone orange, dianthraquinonyl red, and dioxazine violet.

Further, examples of the organic pigment represented by a color index (C.I.) number include the following. Further, conventionally known organic pigments can be used in addition to those described above.

C.I. Pigment Yellow: 12, 13, 14, 17, 20, 24, 74, 83, 86, 93, 109, 110, 117, 120, 125, 128, 137, 138, 147, 148, 151, 153, 154, 166, and 168.

C.I. Pigment Orange: 16, 36, 43, 51, 55, 59, and 61.

C.I. Pigment Red: 9, 48, 49, 52, 53, 57, 97, 122, 123, 149, 168, 175, 176, 177, 180, 192, 215, 216, 217, 220, 223, 224, 226, 227, 228, 238, and 240.

C.I. Pigment Violet: 19, 23, 29, 30, 37, 40, and 50.

C.I. Pigment Blue: 15, 15:1, 15:3, 15:4, 15:6, 22, 60, and 64.

C.I. Pigment Green: 7 and 36.

C.I. Pigment Brown: 23, 25, and 26.

Dispersant

When carbon black or the organic pigment is used, a dispersant is preferably used in combination. A dispersant capable of stably dispersing the above-described pigment in an aqueous medium through action of an anionic group is preferably used. Specific examples of the dispersant include a styrene-acryl acid copolymer, a styrene-acrylic acid-alkyl acrylate copolymer, a styrene-maleic acid copolymer, a styrene-maleic acid-alkyl acrylate copolymer, a styrene-methacrylic acid copolymer, a styrene-methacrylic acid-alkyl acrylate copolymer, a styrene-maleic half ester copolymer, a vinyl naphthalene-acrylic acid copolymer, a vinyl naphthalene-maleic acid copolymer, styrene-maleic anhydride-maleic half ester copolymer, and salts thereof. Further, the dispersant has a weight average molecular weight within a range of preferably 1,000 to 30,000, and particularly preferably 3,000 to 15,000.

Self-dispersing Pigment

A pigment capable of dispersing in an aqueous medium without a dispersant by bonding an ionic group (anionic group) to the surface of the pigment, so-called self-dispersing pigment, can be used. An example of the self-dispersing pigment includes self-dispersing carbon black. An example of the self-dispersing carbon black includes anionic carbon black having an anionic group bonded to the surface of carbon black.

Anionic Carbon Black

An example of the anionic carbon black includes carbon black having at least one anionic group selected from —COOM, $—SO_3M$, $—PO_3HM$, and $—PO_3M_2$ bonded to the surface of carbon black. In the above formulae, M represents a hydrogen atom, an alkali metal, ammonium, or organic ammonium. Of those, carbon black having —COOM or $—SO_3M$ bonded to the surface of carbon black and charged anionically is particularly preferably used in the present invention for favorable dispersibility in the ink.

Specific examples of the alkali metal represented by "M" in the above hydrophilic group include Li, Na, K, Rb, and Cs. Specific examples of the organic ammonium represented by "M" in the hydrophilic group include methyl ammonium, dimethyl ammonium, trimethyl ammonium, ethyl ammonium, diethyl ammonium, triethyl ammonium, methanol ammonium, dimethanol ammonium, and trimethanol ammonium.

Ink of the present invention containing self-dispersing carbon black, wherein M represents ammonium or organic ammonium, can be particularly preferably used because the ink can improve water resistance of a recorded image. The improvement presumably results from decomposition of ammonium and evaporation of ammonia after the ink is provided on the printing medium. Self-dispersing carbon black, wherein M represents ammonium, can be obtained through a method of replacing M of self-dispersing carbon black, wherein M represents an alkali metal, with ammonium by ion-exchange; and a method of converting M thereof to H by addition of an acid and then to ammonium by addition of ammonium hydroxide.

A production method for anionic carbon black involves oxidation treatment of carbon black with sodium hypochlorite, and the method allows chemical bonding of a —COONa group to the surface of carbon black.

Various hydrophilic groups as described above may be directly bonded to the surface of carbon black. Alternatively, various hydrophilic groups may be indirectly bonded to the surface of carbon black with other atomic groups intervened between the surface of carbon black and the hydrophilic groups. Specific examples of the other atomic groups include a linear or branched alkylene group having 1 to 12 carbon atoms; a substituted or unsubstituted phenylene group; and a substituted or unsubstituted naphthylene group. An example of a substituent for the phenylene group or naphthylene group includes a linear or branched alkyl group having 1 to 6 carbon atoms. Specific examples of combinations of the other atomic groups and the hydrophilic groups include $—C_2H_4COOM$, $-Ph-SO_3M$, and -Ph-COOM (wherein, Ph represents a phenylene group).

In the present invention, two or more types of self-dispersing carbon black as described above may be arbitrarily selected and used as a coloring material for the ink. The addition amount of the self-dispersing carbon black in the ink is within the range of preferably 0.1 mass % or more and 15 mass % or less, particularly preferably 1 mass % or more and 10 mass % or less with respect to the total amount of the ink. The self-dispersing carbon black added to the ink within the above range can maintain a sufficiently dispersed state in the ink. Further, a dye may be added to the ink as a coloring material for adjusting color of the ink or the like, in addition to the self-dispersing carbon black.

Colored Fine Particles/microencapsulated Pigments

Pigments microencapsulated with polymers and the like, colored fine particles containing resin particles covered with a coloring material, or the like may be used in addition to those described above as a coloring material. The microcapsules essentially have dispersibility in an aqueous medium, but the dispersant as described above may be included in the ink for improving dispersion stability. In addition, when colored fine particles are used as a coloring material, the above described anionic dispersant or the like is preferably used.

(Aqueous Medium)

The ink-jet ink of the present invention, that is, ink-jet ink including a coloring material, water, and a water-soluble organic compound having water retention ability, wherein the water-soluble organic compound includes a water-soluble organic compound showing a difference of 36% or less between the water retention ability at a temperature of 23° C. and a humidity of 45% and the water retention ability at a temperature of 30° C. and a humidity of 80% is used as ink for the two-liquid system, to thereby allow further suppression of curling phenomenon of a recorded product.

However, even if a conventional ink (ink containing no water-retentive, water-soluble organic compound of the present invention or ink containing an organic solvent except the water-retentive, water-soluble organic compound) is used, curling phenomenon can be considerably suppressed compared with that in a conventional two-liquid system as long as the printing medium coating solution of the present invention is used as a printing medium coating solution. Thus, the ink-jet ink of the present invention is not necessarily required for the ink used for the two-liquid system in the present invention.

Examples of the aqueous medium used for an ink composition of the ink except that of the present invention include water, and a mixed solvent of water and a water-soluble organic solvent. The water-soluble organic solvent particularly preferably has an effect of preventing the ink from drying. Specific examples of the water-soluble organic solvent include alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols each having an alkylene group with 2 to 6 carbon atoms such as ethylene glycol, propylene glycol, butylene glycol, triethylene glycol, 1,2,6-hexanetriol, thiodiglycol, hexylene glycol, and diethylene glycol; lower alkyl ether acetate such as polyethylene glycol monomethyl ether acetate; glycerin; lower alkyl ethers of polyalcohols such as ethylene glycol monomethyl (or ethyl) ether, diethylene glycol methyl (or ethyl) ether, and triethylene glycol monomethyl (or ethyl) ether; polyalcohols such as trimethylolpropane and trimethylolethane; and N-methyl-2-pyrrolidone, 2-pyrrolidone, and 1,3-dimethyl-2-imidazolidinone. The water-soluble organic solvent can be used alone or as a mixture. Deionized water (ion-exchanged water) is preferably used as water.

The content of the water-soluble organic solvent in the ink composition except that of the present invention is not particularly limited. The content of the water-soluble organic solvent is preferably within the range of 3 mass % or more and 50 mass % or less with respect to the total mass of the ink composition. The water content is preferably within a range of 50 mass % or more and 95 mass % or less with respect to the total mass of the ink composition.

(Other Components)

A humectant can be obviously added to the ink as required in addition to the above components. Further, a surfactant, a defoaming agent, an antiseptic, a fungicide, and the like may be added within a range providing the effects of the addition and without inhibiting the intended effects of the present invention for providing an ink with desired physical properties.

[Set of Printing Medium Coating Solution and Ink-jet Ink]

The inventors of the present invention have conducted further studies for suppressing curling phenomenon of a recorded product obtained through the two-liquid system involving image formation by using the printing medium coating solution and the ink-jet ink. As a result, the inventors of the present invention have found that the curling phenomenon of a recorded product to be obtained can be more efficiently suppressed with the ink-jet ink and the printing medium coating solution to be applied to the printing medium satisfying the following condition:

(Condition)

Taking as (A) an absorbance at a maximum wavelength in a visible region (at a wavelength of 550 nm when carbon black is used as the pigment) of a mixture of 50 g of a 800-times diluted aqueous solution of the printing medium coating solution and 0.3 g of a 5-times diluted aqueous solution of the ink-jet ink has been filtered through a filter having a pore size of 0.2 μm 15 minutes after preparation of the mixture, and as (B) an absorbance at a maximum absorption wavelength in the visible region of a mixture of 0.3 g of the 5-times diluted aqueous solution of the ink-jet ink and 50 g of purified water, (A) and (B) satisfy the following relationship:

$$(A)/(B)<0.85$$

The inventors of the present invention assumes the mechanism for efficient suppression of curling phenomenon of the recorded product obtained by using a specified printing medium coating solution and an ink-jet ink as follows. The above-described expression defines the reactivity of the printing medium coating solution and the ink-jet ink. Large amounts of aggregates produced from contact between the polyvalent metal ions in the printing medium coating solution and the coloring material in the ink-jet ink are presumably present in the surface layer of the printing medium, to thereby suppress shrinkage of cellulose after moisture is provided.

The printing medium coating solution and the ink-jet ink of the present invention are preferably used in combination for the two-liquid system, to thereby most efficiently suppress curling phenomenon of a recorded product to be obtained. However, even if a conventional ink is used, curling phenomenon can be considerably suppressed compared with that of the conventional two-liquid system as long as the printing medium coating solution of the present invention is used in combination.

[Ink-jet Recording Apparatus]

Next, an example of a recording apparatus for forming an image by using the printing medium coating solution and/or ink-jet ink will be shown.

Figure 1:
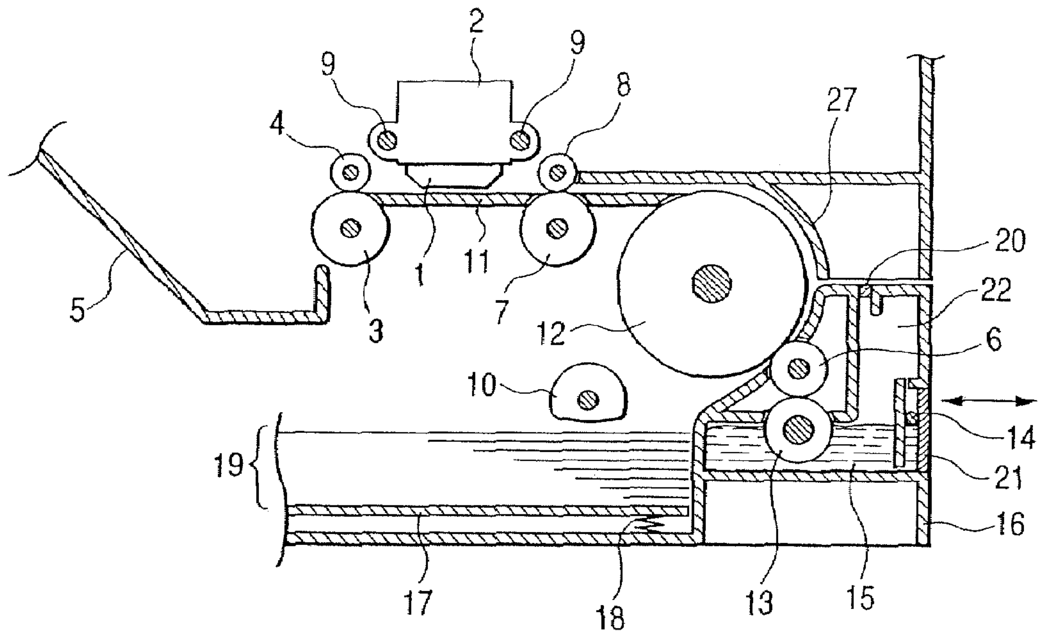
FIG. 1 is a schematic sectional side view showing an example of an ink-jet recording apparatus.

FIG. 1 is a partially sectional diagram showing an example of an ink-jet recording apparatus. The image forming apparatus employs a serial-type ink-jet recording system and includes a recording head 1; a sheet-feeding cassette 16 having a sheet-feeding tray 17 for feeding a recording medium (hereinafter, also referred to as a recording paper) 19 and means for applying the printing medium coating solution of the present invention integrally formed; drive means for allowing the recording head to move back and forth in the direction perpendicular to the direction wherein the recording paper is conveyed; and control means for controlling the drive of the components.

The recording head 1 is mounted on a carriage 2 such that a surface having ink ejection ports provided thereon faces a platen 11. Though not shown, the recording head 1 includes the ink ejection ports; a plurality of electrothermal converters (such as resistance heating elements) to heat an ink liquid; and a substrate supporting them. Further, the recording head 1 has an ink cartridge installed in a carriage placed in the upper part thereof.

The carriage 2 has the recording head 1 mounted thereon, and can move back and forth along two guide shafts 9 extending in parallel along a width direction of the recording paper 19. In addition, the recording head 1 is driven to eject ink liquid drops to the recording paper 19 in synchronization with the carriage moving back and forth to form an image. The sheet-feeding cassette 16 is detachable from the main body of the image forming apparatus. The sheets of the recording paper 19 are stacked on the sheet-feeding tray 17 in the sheet-feeding cassette 16. During sheet feeding, an uppermost sheet is pressed against a sheet-feeding roller 10 by a spring 18 for pressing the sheet-feeding tray 17 upward. The sheet-feeding roller 10 has an almost semicircle cross section, and is rotated by a motor (not shown) to feed only the uppermost sheet (recording paper 19) with a separation claw (not shown).

The separately fed recording paper 19 is conveyed along a convey surface of the sheet-feeding cassette 16 and a convey surface of a paper guide 27 by a large diameter intermediate roller 12 and a small diameter coating roller 6 pressed against the intermediate roller 12. Those convey surfaces are curved in an arc concentric with the intermediate roller 12. Thus, the recording paper 19 is conveyed along those convey surfaces to reverse its conveyance direction. That is, the printing surface of the recording paper 19 faces downward until the recording paper 19 is conveyed from the sheet-feeding tray 17 and reaches the intermediate roller 12, but faces upward (recording head side) when the recording paper 19 faces the recording head 1. Thus, the printing surface of the recording paper always faces outward from the image forming apparatus.

Applying means for the printing medium coating solution is provided in the sheet-feeding cassette 16, and includes a supply tank 22 for supplying a printing medium coating solution 15; a supply roller 13 rotatably supported with its circumferential surface partly immersed in the supply tank 22; and the coating roller 6 arranged in parallel to and in contact with the supply roller 13 to rotate in the same direction. Further, the coating roller 6 is arranged such that its circumferential surface is in contact with and in parallel to the intermediate roller 12 that conveys the recording paper 19. Thus, when the recording paper 19 is conveyed, the supply roller 13 and the coating roller 6 rotate with rotation of the intermediate roller 12. As a result, the printing medium coating solution 15 is supplied to the circumferential surface of the coating roller 6 by the supply roller 13, and the printing medium coating solution is applied uniformly by the coating roller 6 to the printing surface of the recording paper 19 held between the coating roller 6 and the intermediate roller 12.

Further, the image forming apparatus is provided with a float 14 in the supply tank 22. The float 14 is formed of a substance having a smaller specific gravity than that of the printing medium coating solution 15, and floats on the surface of the printing medium coating solution, thereby allowing external visual observation of the residual amount of printing medium coating solution through a level indicator window 21 formed of a transparent member.

Figure 2:
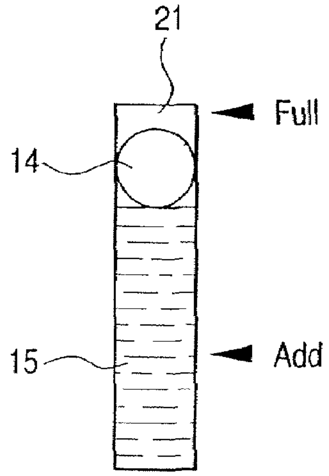
FIG. 2 is a sectional front view of a printing medium coating solution level indicator provided to the ink-jet recording apparatus of FIG. 1.

FIG. 2 is a diagram showing a level indicator viewed from the front. In the level indicator, an indicator indicating the level of the residual amount of the printing medium coating solution is provided along the longitudinal direction of the level indicator window 21. In the figure, the tank is full with the printing medium coating solution when the surface of the printing medium coating solution or the float 14 reaches the position marked "Full". In contrast, the surface of the printing medium coating solution or the float 14 at the position marked "Add" indicates that the level of the printing medium coating solution is low. Thus, it is very clear that the printing medium coating solution should be supplied when the level of the printing medium coating solution 15 gradually drops and the float 14 reaches the Add line.

Figure 3:
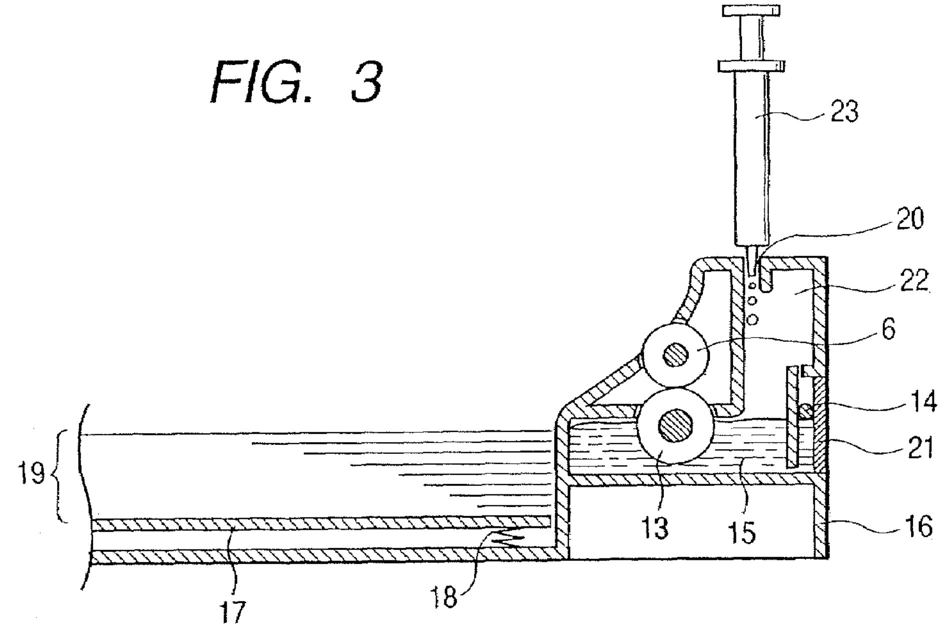
FIG. 3 is a schematic sectional side view showing supply of a printing medium coating solution to the ink-jet recording apparatus of FIG. 1.

FIG. 3 describes the method of supplying the printing medium coating solution. That is, the sheet-feeding cassette 16 is pulled out of the main body of image forming apparatus, and the tip of an injector 23 is inserted into an inlet 20 made of a split-rubber member to inject the printing medium coating solution into the supply tank 22.

In this way, the recording paper having the printing medium coating solution applied thereto is then conveyed at a certain speed by a main conveying roller 7 and a pinch roller 8 pressed against the main conveying roller 7 to reach the recording part, where the ink is provided to the recording paper 19 from the recording head 1. The recording sheet 19 fed and printed in the configuration described above is discharged and conveyed by a sheet-discharge roller 3 and a spur 4 pressed against the sheet-discharge roller 3, and is then stacked on a sheet-discharge tray 5.

Further, when the printing medium coating solution is applied by a roller or the like, it is preferable that the viscosity of the printing medium coating solution be-higher than that of the ink for efficient destabilization of the ink with a smaller application amount of the printing medium coating solution, and for favorable fixability or the like of a recorded product.

Figure 4:
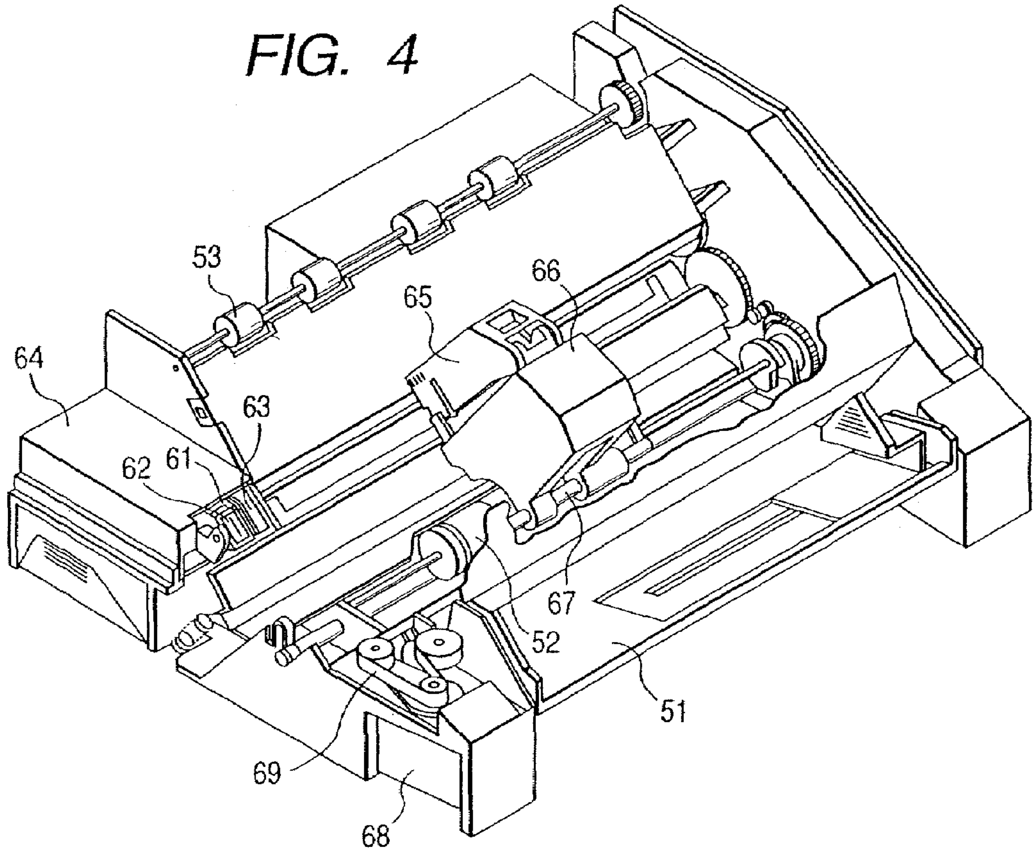
FIG. 4 is a schematic perspective view showing an example of an ink-jet recording apparatus.

FIG. 4 shows another example of an ink-jet recording apparatus. In FIG. 4, reference numeral 61 represents a blade as a wiping member which has one end held and fixed by a blade-holding member and is in a form of cantilever. The blade 61 is provided at a position adjacent to a recording region where a recording head 65 operates. Further in this example, the blade 61 is held to protrude into the moving path of the recording head 65.

Reference numeral 62 represents a cap for the ink ejection surface of the recording head 65. The cap is arranged in a home position adjacent to the blade 61, moves in the direction perpendicular to the moving direction of the recording head 65, and caps the ink ejection surface when it is brought into contact therewith. Reference numeral 63 represents an ink absorber provided adjacent to the blade 61, which is held to protrude into the moving path of the recording head 65 like the blade 61. The above-described blade 61, cap 62, and ink absorber 63 constitute a ejection recovery part 64, and the blade 61 and the ink absorber 63 serve to remove water, dust, and the like on the ink ejection surface. Further, the blade 61, cap 62, and ink absorber 63 constitute a recovery unit for sucking each ink or the printing medium coating solution positioned at the ejection ports of the recording head by a pump (not shown) through the cap, and for recovering the recording head for intrinsic ejection performance of the ink or printing medium coating solution.

Reference numeral 65 represents a recording head which includes ejection energy generating means for ejecting ink towards a printing medium opposite to the ink ejection surface provided with the ejection ports to perform recording. Reference numeral 66 represents a carriage for carrying and moving the recording head 65. The carriage 66 is slidably engaged with a guide shaft 67, and a part (not shown) of the carriage 66 is connected to a belt 69 driven by a motor 68. Thus the carriage 66 can move along the guide shaft 67, and the recording head 65 can move in the recording region and the region adjacent thereto. Reference numeral 51 represents a recording medium feeding part for inserting a recording medium, and reference numeral 52 represents a sheet-delivery roller driven by a motor (not shown).

With such a configuration, the printing medium is fed to the position opposite to the ink ejection surface of the recording head 65 and conveyed to a sheet-discharge part provided with a sheet-discharge roller 53 as recording proceeds. In the above configuration, while the recording head 65 returns to its home position after recording, the cap 62 of the ejection recovery part 64 recedes from the moving path of the recording head 65, but the blade 61 protrudes into the moving path. As a result, the ink ejection ports of the recording head 65 are subjected to wiping. When the cap 62 is brought into contact with the ejection surface of the recording head 65 for capping, the cap 62 moves to protrude into the moving path of the recording head 65. When the recording head 65 moves from its home position to the position where recording is started, the cap 62 and the blade 61 are at the same positions as the position of wiping as described above. As a result, the ejection surface of the recording head 65 is also subjected to wiping by this movement.

The above movement of the recording head to its home position is conducted not only at the completion of the recording or during ejection recovery. Further, when the recording head moves in the recording region for recording, the recording head moves to the home position adjacent to the recording region at given intervals during recording, to thereby perform wiping of the ejection surface with the movement.

Figure 5:
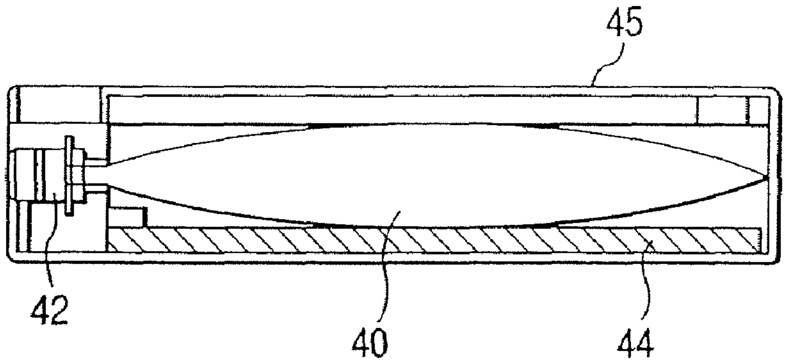
FIG. 5 is a longitudinal sectional view showing an example of an ink cartridge.
Figure 6:
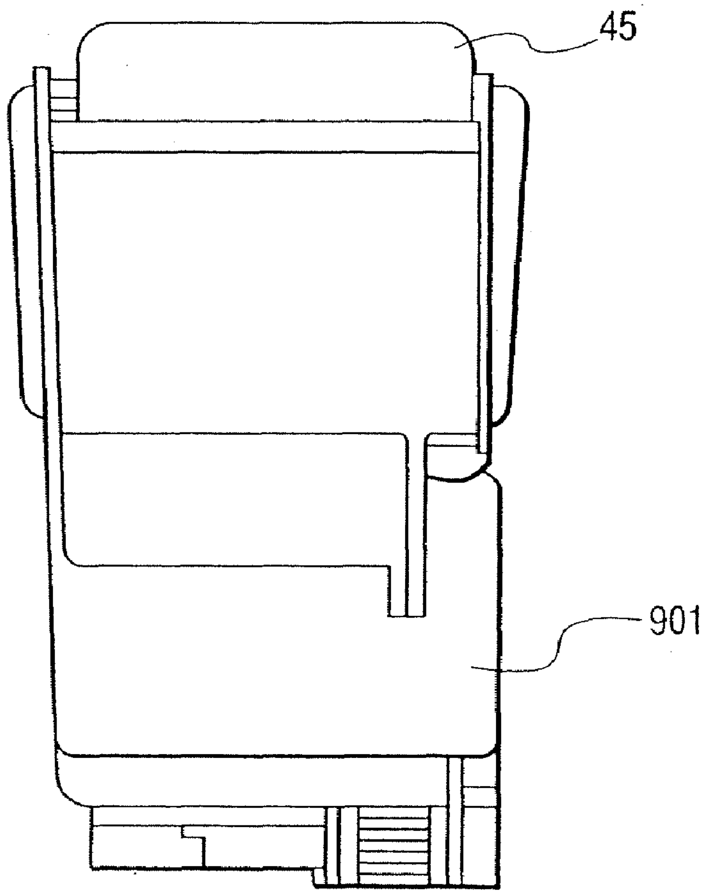
FIG. 6 is a schematic plan view showing an ink cartridge installed in a recording head.
Figure 7:
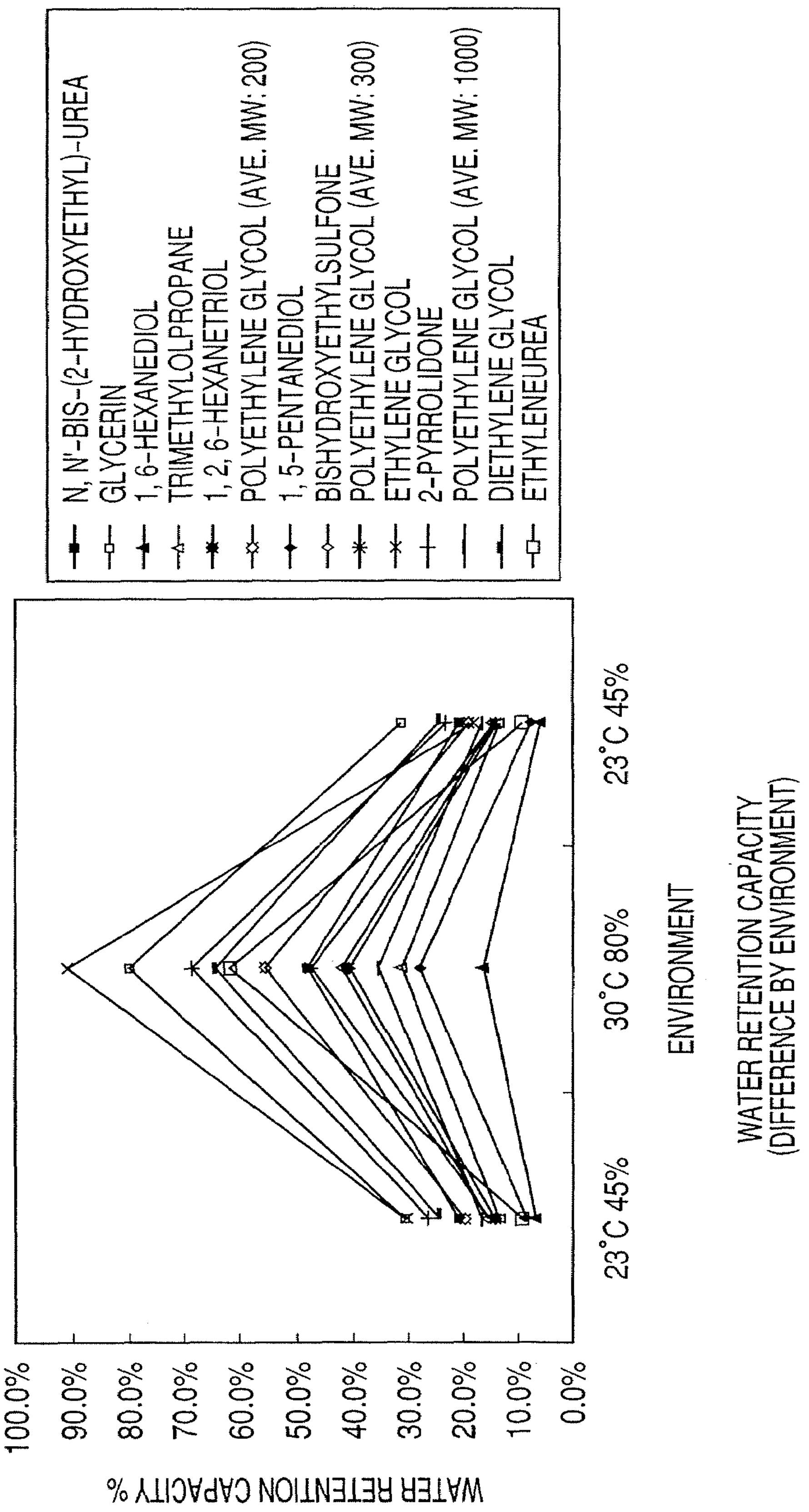
FIG. 7 is a diagram showing results of measurement (difference by environment) on water retention ability of water-soluble organic compounds.

FIG. 5 shows an example of an ink cartridge 45 for storing ink or a printing medium coating solution containing no coloring material and for supplying the ink or printing medium coating solution to the recording head through a member such as a tube. In the figure, reference numeral 40 represents a storage part for the ink or printing medium coating solution to be supplied such as a bag having a tip equipped with a rubber stopper 42. A needle (not shown) is inserted into the stopper 42, to thereby allow supply of the ink or printing medium coating solution in the bag 40 to the recording head. Reference numeral 44 represents an ink absorber for receiving waste ink or waste printing medium coating solution. The storage part 40 preferably has a surface in contact with the ink or printing medium coating solution formed of polyolefin, particularly polyethylene. As shown in FIG. 6, the cartridge is configured such that the cartridge 45 is detachable from a recording head 901 for ejecting the ink or printing medium coating solution, and that the ink or printing medium coating solution is supplied to the recording head 901 when the cartridge 45 is mounted on the recording head, for example.

[Ink Properties; Ink-jet Ejection Properties, Permeability to Printing Medium]

The set of the printing medium coating solution and ink-jet ink according to the present invention is particularly preferably used for ink-jet recording. Examples of the ink-jet recording method include a recording method involving application of mechanical energy to the ink for ejection of liquid drops; and a recording method involving application of heat energy to the ink for foaming of the ink and ejection of the liquid drops. The ink-jet ink or printing medium coating solution of the present invention can be used for those recording methods. In this case, the printing medium coating solution or ink of the present invention is preferably able to be ejected from an ink-jet head. Preferable properties of the ink or printing medium coating solution include a viscosity of 1 to 15 mPa·s, and a surface tension of 25 mN/m (dyne/cm) or more, and particularly preferable properties thereof include a viscosity of preferably 1 to 5 mPa·s, and a surface tension of 25 to 50 mN/m (dyne/cm) from the viewpoint of ejecting properties from the ink-jet head. Further, since the printing medium coating solution of the present invention must react with specific ink alone on a printing medium such as paper, it is preferable that the surface tension of the printing medium coating solution be within a range allowing ejection of the printing medium coating solution from the ink-jet head, and be higher than that of the ink to be destabilized by the printing medium coating solution such that the printing medium coating solution does not spread to regions other than regions recorded by the specific ink.

EXAMPLES

Hereinafter, the present invention will be described more specifically by way of examples and comparative examples, but the present invention is not limited to the examples described below without departing from the scope of the invention. Note that, "part" and "%" refer to "parts by mass" and "mass %" in the following descriptions unless otherwise noted.

[Evaluation of Printing Medium Coating Solution]

(Preparation of Printing Medium Coating Solution)

Components in Table 1 were mixed, and sufficiently stirred and dissolved. The solution was then filtered under pressure through a microfilter with a pore size of 1 μm (available from Fuji Photo Film Co., Ltd.), to thereby prepare each of printing medium coating solutions 1 to 16. Note that, the units are represented by mass %.

TABLE 1

| | Difference in water retention ability | Molecular weight | Printing medium coating solution 1 | 2 | 3 | 4 | 5 | 6 | 7 | 8 | 9 | 10 |
|---|---|---|---|---|---|---|---|---|---|---|---|---|
| Trimethylolpropane | 18.0 | 134.2 | | 10.0 | 10.0 | 15.0 | | 7.5 | 15.0 | 15.0 | 7.5 | 15.0 |
| Polyethylene glycol 200 | 36.0 | 200.0 | | | | | 15.0 | 7.5 | 15.0 | | 7.5 | 15.0 |
| N,N'-Bis-(2-hydroxyethyl)-urea | 27.4 | 148.2 | 20.0 | 10.0 | | | | | | | | |
| 1,6-Hexanediol | 9.9 | 118.2 | | | 10.0 | | | | | | | |
| Ethylene glycol | 60.6 | 62.1 | | | | | | | | | | |
| 2-Pyrrolidone | 42.0 | 85.1 | | | | | | | | | | |
| Lithium acetate dihydrate | — | — | | | | | | | | 0.2 | 0.2 | 0.2 |
| Calcium nitrate tetrahydrate | — | — | | | | 18.0 | 18.0 | 18.0 | 18.0 | 18.0 | 18.0 | 18.0 |
| Acetylenol EH (*) | — | — | 1.0 | 1.0 | 1.0 | 1.0 | 1.0 | 1.0 | 1.0 | 1.0 | 1.0 | 1.0 |
| Ion-exchanged water | — | — | 79.0 | 79.0 | 79.0 | 66.0 | 66.0 | 66.0 | 51.0 | 65.8 | 65.8 | 50.8 |

| | Difference in water retention ability | Molecular weight | Printing medium coating solution 11 | 12 | 13 | 14 | 15 | 16 |
|---|---|---|---|---|---|---|---|---|
| Trimethylolpropane | 18.0 | 134.2 | | | 10.0 | | 10.0 | |
| Polyethylene glycol 200 | 36.0 | 200.0 | | | | | | |
| N,N'-Bis-(2-hydroxyethyl)-urea | 27.4 | 148.2 | 10.0 | | | 15.0 | | |
| 1,6-Hexanediol | 9.9 | 118.2 | | | | | | |
| Ethylene glycol | 60.6 | 62.1 | 10.0 | 20.0 | | 15.0 | | |
| 2-Pyrrolidone | 42.0 | 85.1 | | | | | | 15.0 |
| Lithium acetate dihydrate | — | — | | | | | | |
| Calcium nitrate tetrahydrate | — | — | | | | | 18.0 | 18.0 |
| Acetylenol EH (*) | — | — | 1.0 | 1.0 | 1.0 | 1.0 | 1.0 | 1.0 |
| Ion-exchanged water | — | — | 79.0 | 79.0 | 89.0 | 69.0 | 71.0 | 66.0 |

(*) Acetylene glycol ethylene oxide adduct (surfactant), available from Kawaken Fine Chemicals Co., Ltd.

(Presence or Absence of Buffer Action)

A pH of each of the obtained printing medium coating solutions 4, 6 to 10, 14, and 15 was measured. Then, a pH of a solution prepared by adding 1.0 mL of a 0.1 N aqueous solution of nitric acid to 50 mL of the printing medium coating solution was measured, and a change in hydrogen ion concentration was measured, to thereby study the presence or absence of the buffer action of the printing medium coating solution. Table 2 shows the results.

TABLE 2

| Printing medium coating solution | Initial pH | pH after addition of aqueous solution of nitric acid | Change in hydrogen ion concentration | Presence or absence of buffer action |
|---|---|---|---|---|
| 4 | 7.2 | 2.4 | $4.0 \times 10^{-3}$ | Absent |
| 6 | 7.4 | 2.4 | $4.0 \times 10^{-3}$ | Absent |
| 7 | 6.9 | 2.3 | $5.0 \times 10^{-3}$ | Absent |
| 8 | 7.0 | 5.2 | $6.2 \times 10^{-6}$ | Present |
| 9 | 7.2 | 5.2 | $6.2 \times 10^{-6}$ | Present |
| 10 | 6.9 | 4.8 | $1.6 \times 10^{-5}$ | Present |
| 14 | 7.4 | 2.5 | $3.2 \times 10^{-3}$ | Absent |
| 15 | 8.1 | 2.3 | $5.0 \times 10^{-3}$ | Absent |

(Evaluation of Curling Phenomenon)

Each of the obtained printing medium coating solutions 1 to 16 was applied onto a printing medium with a coating roller, and curling phenomenon of the printing medium was evaluated by the following procedure. Note that, a speed of the roller and a contact pressure of the roller with the printing medium were adjusted to provide an application amount of the printing medium coating solution to the printing medium of 2.4 g/$m^2$. PB paper available from Canon Inc. was used as the printing medium. An evaluation method on curling phenomenon is described below.

Curl extent of the printed product was measured with time just after printing (within 1 min); and after the printed product was left standing for 1 hour, 1 day, 2 days, 3 days, and 7 days under the conditions of a temperature of 24° C. and a humidity of 50%. Curl is referred to as being positive when the paper of the printed product was curved inward, and negative when it was curved outward. A distance from the tip of the curled paper to the contact surface of the paper was measured with a ruler. The curl extent was evaluated in accordance with the following standards. Table 3 shows the results of the evaluation.

TABLE 3

| | | Printing medium | Evaluation of curling phenomenon | | | | | |
|---|---|---|---|---|---|---|---|---|
| | | coating solution | Just after | After 1 hour | After 1 day | After 2 days | After 3 days | After 7 days |
| Examples | 1 | 1 | AA | AA | AA | A | A | A |
| | 2 | 2 | AA | AA | AA | A | A | A |
| | 3 | 3 | AA | AA | AA | A | A | A |
| | 4 | 4 | AA | AA | AA | AA | AA | A |
| | 5 | 5 | AA | AA | AA | A | A | A |
| | 6 | 6 | AA | AA | AA | A | A | A |
| | 7 | 7 | AA | AA | AA | AA | AA | AA |
| | 8 | 8 | AA | AA | AA | AA | AA | A |
| | 9 | 9 | AA | AA | AA | A | A | A |
| | 10 | 10 | AA | AA | AA | AA | AA | AA |
| Comparative Examples | 1 | 11 | A | B | C | C | C | C |
| | 2 | 12 | A | C | C | C | C | C |
| | 3 | 13 | A | A | B | B | B | C |
| | 4 | 14 | AA | AA | AA | A | B | C |
| | 5 | 15 | A | A | B | B | B | C |
| | 6 | 16 | A | C | C | C | C | C |

AA: ±10 mm or less
A: more than ±10 mm, and ±25 mm or less
B: more than ±25 mm, and ±40 mm or less
C: tip of paper warped or curled up inward

[Evaluation of Ink]

(Preparation of Ink)

Components in Table 4 were mixed, and sufficiently stirred and dissolved. The solution was then filtered under pressure through a membrane filter with a pore size of 0.2 μm (available from Fuji Photo Film Co., Ltd.), to thereby prepare each of inks 1 to 10. Note that, the units are represented by mass %.

TABLE 4

| | Difference in water retention ability | Molecular weight | Ink 1 | 2 | 3 | 4 | 5 | 6 | 7 | 8 | 9 | 10 |
|---|---|---|---|---|---|---|---|---|---|---|---|---|
| C.I. Direct Blue 199 | — | — | 5.0 | 5.0 | 5.0 | 5.0 | 5.0 | 5.0 | 5.0 | 5.0 | 5.0 | 5.0 |
| Trimethylolpropane | 18.0 | 134.2 | | | 30.0 | | | | | | | |
| Polyethylene glycol 200 | 36.0 | 200.0 | | 30.0 | | | | | | | | |
| N,N'-Bis-(2-hydroxyethyl)-urea | 27.4 | 148.2 | 30.0 | | | | 10.0 | 18.0 | | 10.0 | 10.0 | 15.0 |
| 1,6-Hexanediol | 9.9 | 118.2 | | | | 30.0 | | | | | | 15.0 |
| 1,2,6-Hexanetriol | 26.3 | 134.2 | | | | | 5.0 | | | | | |
| 1,5-Pentanediol | 19.2 | 104.2 | | | | | 10.0 | 2.0 | | | | |
| Ethylene glycol | 60.6 | 62.1 | | | | | | | 30.0 | | 10.0 | |
| Acetylenol EH (*) | — | — | 0.6 | 0.6 | 0.6 | 0.6 | 0.6 | 0.6 | 0.6 | 0.6 | 0.6 | 0.6 |
| Ion-exchanged water | — | — | 64.4 | 64.4 | 64.4 | 64.4 | 69.4 | 74.4 | 64.4 | 84.4 | 74.4 | 64.4 |

(*) Acetylene glycol ethylene oxide adduct (surfactant), available from Kawaken Fine Chemicals Co., Ltd.

(Preparation of Pigment Ink)

Next, pigment dispersions 1 and 2 were prepared. Pigment inks were prepared by using the obtained pigment dispersions 1 and 2. For preparation of the pigment ink, components in Table 5 were mixed and sufficiently stirred. The mixture was then filtered under pressure through a membrane filter with a pore size of 0.3 μm (available from Fuji Photo Film Co., Ltd.), to thereby prepare each of inks 11 to 13.

Pigment Dispersion 1

10 parts of Monarch 880 (available from Cabot Corporation) as a pigment, 40 parts of an anionic polymer P-1 (styrene/M230G (methoxypolyethylene glycol methacrylate, available from Shin-Nakamura Chemical Co., Ltd.)/acrylic acid copolymer (copolymerization ratio (mass ratio)=65/12/25), acid value of 160, weight average molecular weight of 8,000, aqueous solution with a solid content of 10% (neutralizing agent:potassium hydroxide)), and 50 parts of purified water were mixed, and the mixture was placed in a batch-type vertical sand mill (manufactured by IMEX Co., Ltd.). 250 parts of zirconia beads of 0.3 mm diameter were filled therein, and the mixture was subjected to dispersion treatment for 10 hours while being cooled by water. The dispersion liquid was centrifuged to remove coarse particles, to thereby obtain a pigment dispersion 1 having a solid content of about 14.0% and a weight average particle size of 110 nm as a final product.

Pigment Dispersion 2

10 parts of Monarch 880 (available from Cabot Corporation) as a pigment, 40 parts of an anionic polymer P-2 (styrene/acrylic acid copolymer (copolymerization ratio (mass ratio)=70/30), acid value of 180, weight average molecular weight of 10,000, aqueous solution with a solid content of 10%, neutralizing agent: potassium hydroxide), and 50 parts of purified water were mixed, and the mixture was placed in a batch-type vertical sand mill (manufactured by IMEX Co., Ltd.). 150 parts of zirconia beads of 0.3 mm diameter were filled therein, and the mixture was subjected to dispersion treatment for 10 hours while being cooled by water. The dispersion liquid was centrifuged to remove coarse particles, to thereby obtain a pigment dispersion having a solid content of about 14% and a weight average particle size of 110 nm as a final product. 30 parts of an anionic polymer P-3 (ethyl acrylate/acrylic acid copolymer (copolymerization ratio (mass ratio)=87/13), acid value of 100, weight average molecular weight of 11,000, aqueous solution with a solid content of 10% (neutralizing agent: potassium hydroxide)) was added to the obtained pigment dispersion, to thereby obtain a pigment dispersion 2.

TABLE 5

| | Difference in water retention ability | Molecular weight | Ink 11 | Ink 12 | Ink 13 |
|---|---|---|---|---|---|
| Pigment dispersion 1 | — | — | 40.0 | 40.0 | |
| Pigment dispersion 2 | — | — | | | 40.0 |
| Polyethylene glycol 1000 | 18.9 | 1,000 | 5.0 | | |
| Glycerin | 49.2 | 92.1 | 5.0 | | |
| Diethylene glycol | 39.7 | 118.2 | 5.0 | | |
| Trimethylolpropane | 18.0 | 134.2 | | 5.0 | 5.0 |
| Polyethylene glycol 200 | 36.0 | 200.0 | | 13.0 | 13.0 |
| 1,5-Pentanediol | 19.2 | 104.2 | | 2.0 | 2.0 |
| Acetylenol EH (*) | — | — | 1.0 | 1.0 | 1.0 |
| Ion-exchanged water | — | — | 44.0 | 39.0 | 39.0 |

(*) Acetylene glycol ethylene oxide adduct (surfactant), available from Kawaken Fine Chemicals Co., Ltd.

(**) Polyoxyethylene cetyl ether (surfactant), available from Nikko Chemicals Co., Ltd.

(Evaluation of Curling Phenomenon and Ejection Stability)

Each of the inks 1 to 13 was provided on the printing medium by using an ink-jet recording apparatus having an on-demand type multi recording head for applying heat energy to the ink in accordance with recording signals for ejection of the ink. The ink-jet recording apparatus had a ejection amount of 2.8 pL per dot and a recording density of 2,400×1,200 dpi, and was driven by a device having a drive frequency of 10 kHz. Thus, an A4-size solid color image (20×25 cm) was formed. A4-size PPC paper (available from Canon Inc.) was used as the printing medium for evaluation. 2-pass printing involving scanning of a printing region twice was employed for printing, and an application amount of ink-jet ink to the printing medium was 12.5 g/m$^2$.

Evaluation Method on Curling Phenomenon

The evaluation method on curling phenomenon by the ink was the same as that in the case where the printing medium coating solution 15 was used. Table 6 shows the results of the evaluation.

Evaluation Method on Ejection Stability (Start-up Properties)

For evaluation of ink ejection stability, distortion, blurring, and the like of a printing portion at a start of printing were observed in a normal temperature and normal humidity environment. The ejection stability (start-up properties) was evaluated in accordance with the following standards. Table 6 shows the results of the evaluation.

TABLE 6

| | | Ink | Evaluation of curling phenomenon: After 1 hour | After 1 day | After 2 days | After 3 days | After 7 days | Ejection stability |
|---|---|---|---|---|---|---|---|---|
| Examples | 11 | 1 | AA | AA | AA | AA | AA | B |
| | 12 | 2 | AA | AA | AA | AA | AA | B |
| | 13 | 3 | AA | AA | AA | AA | AA | B |
| | 14 | 4 | AA | AA | A | A | A | B |
| | 15 | 5 | AA | AA | AA | AA | AA | A |
| | 16 | 6 | AA | AA | A | A | A | A |
| | 17 | 10 | AA | AA | AA | A | A | B |
| | 18 | 12 | AA | AA | A | A | A | B |
| | 19 | 13 | AA | AA | A | A | A | B |
| Comparative Examples | 7 | 7 | C | C | C | C | C | A |
| | 8 | 8 | B | B | B | B | B | A |
| | 9 | 9 | B | C | C | C | C | A |
| Reference Example | 1 | 11 | B | B | B | C | D | B |

A: No blurring
B: Slight blurring of printing portion
C: Considerable blurring of printing portion

[Evaluation of Curling Phenomenon of Printed Product obtained through Two-liquid System]

Next, curling phenomenon of the printed product obtained through a system (two-liquid system) involving provision of the printing medium coating solution to the printing medium and provision of the ink thereto was observed. Further, the printing medium coating solution was stored for a long period of time, and images were formed by using the printing medium coating solution before and after storage as the printing medium coating solution for the two-liquid system. Then, change in quality of the obtained recorded products was observed.

(Production of Recorded Product for Two-liquid System)

Each of the printing medium coating solutions 1 and 10 as the printing medium coating solution was provided on a printing medium through roller coating by using a coating roller having a configuration as shown in FIG. 1. The speed of the roller and the contact pressure of the roller with the printing medium were adjusted to provide an application amount of the printing medium coating solution to the printing medium of 2.4 g/m$^2$. PB paper (A4 size) available from Canon Inc. was used as the printing medium.

Each of the inks 1, 3, 4, 6 to 9, and 11 to 13 was provided on the printing medium by using an ink-jet recording apparatus having an on-demand type multi recording head for applying heat energy to the ink in accordance with recording signals just after the printing medium coating solution had been applied for ejection of the ink. The following evaluation was performed. The ink-jet recording apparatus had an ejection amount of 2.8 pL per dot and a recording density of 2,400×1,200 dpi, and was driven by a device having a drive frequency of 10 kHz. Thus, an A4-size solid color image (20×25 cm) was formed. A4-size PPC paper (available from Cannon Inc.) was used as the printing medium for evaluation.

2-pass printing involving scanning of a printing region twice was employed for printing, and an application amount of ink-jet ink to the printing medium was 12.5 g/$m^2$.

(Reactivity of Ink and Printing Medium Coating Solution)

The following set of the printing medium coating solution and the ink was used and mixed under the following conditions. An absorbance of the mixture was measured for evaluation of the reactivity. Table 7 shows the results.

Taking as (A) an absorbance at 550 nm of a mixture of 50 g of a 800-times diluted aqueous solution of the printing medium coating solution and 0.3 g of a 5-times diluted aqueous solution of the ink was filtered through a filter having a pore size of 0.2 μm 15 minutes after preparation of the mixture and as (B) an absorbance at 550 nm of a mixed solution of 0.3 g of the 5-times diluted aqueous solution of the ink and 50 g of purified water, the value of (A)/(B) as an indication of reactivity was determined. Each of the inks 1, 3, 4, and 6 containing no pigment as a coloring material was mixed with the printing medium coating solution in the same manner as described above, and a value of (A)/(B) was 1, indicating no reactivity.

TABLE 7

| Printing medium coating solution | Ink | Reactivity (A)/(B) |
|---|---|---|
| 10 | 11 | 0.36 |
| 10 | 12 | 0.36 |
| 10 | 13 | 0.77 |

(Evaluation of Curling Phenomenon)

The evaluation method on curling phenomenon was the same as that in the case where the printing medium coating solution 15 was used. Table 8 shows the results of the evaluation.

TABLE 8

| | | Printing medium coating solution | Ink | Evaluation of curling phenomenon: After 1 hour | After 1 day | After 2 days | After 3 days | After 7 days |
|---|---|---|---|---|---|---|---|---|
| Examples | 20 | 1 | 1 | AA | AA | AA | AA | AA |
| | 21 | 1 | 3 | AA | AA | AA | AA | AA |
| | 22 | 1 | 4 | AA | AA | AA | A | A |
| | 23 | 1 | 6 | AA | AA | AA | A | A |
| | 24 | 10 | 12 | AA | AA | AA | AA | A |
| | 25 | 10 | 13 | AA | AA | AA | A | A |
| Reference Example | 2 | 1 | 7 | C | C | C | C | C |
| | 3 | 1 | 8 | B | B | B | B | B |
| | 4 | 1 | 9 | C | C | C | C | C |
| | 5 | 10 | 11 | A | A | A | B | C |

(Evaluation on Image Change by Storage)

Each of the printing medium coating solutions 4, 6 to 10, 14, and 15 was provided on a printing medium and the ink 11 was solid printed (width of 2× and length of 2 cm) at the center of the printing medium. Strike through of the coloring material was visually observed from a backside of the printed surface, and a print density on a front side of the printed surface was measured. The strike through of the coloring material was observed and the print density was measured in the same manner by using the printing medium coating solution hermetically stored in an oven at 60° C. for 1 month.

The change in quality of images obtained by using the printing medium coating solution before and after storage was evaluated in accordance with the following standards. The ink-jet recording apparatus had an ejection amount of 2.8 pL per dot and a recording density of 2,400×1,200 dpi, and was driven by a device having a drive frequency of 10 kHz. The speed of the roller and the contact pressure of the roller with the printing medium were adjusted to provide an application amount of the printing medium coating solution to the printing medium of 2.4 g/$m^2$. Table 9 shows the results of the evaluation.

TABLE 9

| | | Printing medium coating solution | Ink | pH of printing medium coating solution: Before storage | After storage | Difference | Change in quality |
|---|---|---|---|---|---|---|---|
| Examples | 26 | 8 | 11 | 7.0 | 5.7 | 1.3 | A |
| | 27 | 9 | 11 | 7.2 | 6.0 | 1.2 | A |
| | 28 | 10 | 11 | 6.9 | 5.6 | 1.3 | A |
| Comparative Examples | 10 | 14 | 11 | 7.4 | 3.4 | 4.0 | C |
| | 11 | 15 | 11 | 8.1 | 2.5 | 5.6 | C |
| Reference Examples | 6 | 4 | 11 | 7.2 | 3.6 | 3.6 | — |
| | 7 | 6 | 11 | 3.6 | 4.7 | 1.1 | — |
| | 8 | 7 | 11 | 6.6 | 2.6 | 4.0 | — |

A: almost no change in strike through and in print density compared with those of comparative examples
B: comparable or greater change in one of strike through and print density compared with those of comprative examples
C: comparable or greater changes in strike through and print density compared with those of comparative examples The same evaluation on change in image quality by storage was performed by using each printing medium coating solution stored in an oven at 60° C. for 1 month. For Examples 25 to 27, no change in strike through was observed before and after storage, but for Comparative Examples 10 and 11, a level of strike through changed before and after storage.

The present application claims priority from Japanese Patent Application No. 2004-075368 filed on Mar. 16, 2004, Japanese Patent Application No. 2004-075370 filed on Mar. 16, 2004, and Japanese Patent Application No. 2005-068134 filed on Mar. 10, 2005, and is partly incorporated by reference herein.

What is claimed is:

1. A printing medium coating solution comprising water and a water-soluble organic compound, wherein the water-soluble organic compound comprises only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the printing medium coating solution.

2. A printing medium coating solution according to claim 1, further comprising polyvalent metal ions.

3. A printing medium coating solution according to claim 1, wherein the water-soluble organic compound has the difference in water retention ability of 17.5% or more.

4. A printing medium coating solution according to claim 1, wherein two or more types of water-soluble organic compounds each having a difference in water retention ability of 36% or less are included.

5. A printing medium coating solution according to claim 1, wherein three or more types of water-soluble organic compounds each having a difference in water retention ability of 36% or less are included.

6. A printing medium coating solution according to claim 1, wherein the content of water is 77 mass % or less with respect to the total amount of the printing medium coating solution.

7. A printing medium coating solution according to claim 1, which is used in combination with an ink.

8. A set of a printing medium coating solution and an ink-jet ink, comprising the printing medium coating solution according to claim 1.

9. A set of a printing medium coating solution and an ink-jet ink according to claim 8, which satisfies the following condition:

Taking as (A) an absorbance at a maximum absorption wavelength in a visible region (at a wavelength of 550 nm when carbon black is used as a coloring material) of a mixture of 50 g of a 800-times diluted aqueous solution of the printing medium coating solution and 0.3 g of a 5-times diluted aqueous solution of the ink-jet ink being filtered through a filter having a pore size 0.2 ÿm 15 minutes after preparation of the mixture, and as (B) an absorbance at a maximum absorption wavelength in the visible region of a mixture of 0.3 g of a 5-times diluted aqueous solution of the ink-jet ink and 50 g of purified water,(A) and (B) satisfy the following relationship:

$$(A)/(B)<0.85.$$

10. An image forming method comprising the steps of providing a printing medium with an ink; and providing the printing medium with a printing medium coating solution, wherein the set according to claim 8 is used for the printing medium coating solution and the ink in the steps.

11. An ink jet recording apparatus comprising the units of providing a printing medium with an ink by a recording head; and providing a printing medium with a printing medium coating solution, wherein the set according to claim 8 is used for the ink and the printing medium coating solution in the units.

12. An ink jet recording apparatus, comprising the printing medium coating solution according to claim 1; and an ink-jet ink comprising a coloring material, water, and a water-soluble organic compound, wherein the water-soluble organic compound comprises only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the ink-jet ink.

13. A printing medium coating solution according to claim 1, wherein the water-soluble organic compound comprises at least one compound selected from the group consisting of a polyalcohol having an amide bond; polyethylene glycol having a molecular weight of 200 to 300 or 1000; N, N'-bis-(2-hydroxyethyl) -urea; bishydroxyethyl sulfone; 1,2,6-hexanetriol; 1,5-pentanediol; 1,6-hexandediol; and trimethylolpropane.

14. An ink-jet ink comprising a coloring material, water, and a water-soluble organic compound, wherein the water-soluble organic compound comprises only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the ink-jet ink.

15. An ink-jet ink according to claim 14, wherein the water-soluble organic compound has the difference in water retention ability of 17.5% or more.

16. An ink-jet ink according to claim 14, wherein two or more types of water-soluble organic compounds each having a difference in water retention ability of 36% or less are included.

17. An ink-jet ink according to claim 14, wherein three or more types of water-soluble organic compounds each having a difference in water retention ability of 36% or less are included.

18. An image forming method comprising the steps of providing a printing medium with an ink; and providing the printing medium with a printing medium coating solution, wherein the ink comprises the ink-jet ink according to claim 14; and the printing medium coating solution comprises a printing medium coating solution comprising water and a water-soluble organic compound, wherein the water-soluble organic compound comprises only a water-soluble organic compound showing a difference of 36% or less between the water retention ability at a temperature of 23° C. and a humidity of 45% and the water retention ability at a temperature of 30° C. and a humidity of 80%; and the content of the water-soluble organic compound is 15 mass % or more with respect to the total amount of the printing medium coating solution.

19. A set of a printing medium coating solution and an ink-jet ink, comprising the ink-jet ink according to claim 14.

20. A set of a printing medium coating solution and an ink-jet ink according to claim 19, which satisfies the following condition:

$$(A)/(B)<0.85$$

wherein (A) represents an absorbance of a mixture prepared by mixing 50 g of an 800-times diluted aqueous solution of the printing medium coating solution and 0.3 g of a 5-times diluted aqueous solution of the ink-jet ink and filtering the mixture through a 0.2 ÿm filter 15 min after the preparation at a maximum absorption wavelength (wavelength of 550 nm if carbon black is used as a coloring material) in a visible range; and (B) represents an absorbance of a mixed liquid containing 0.3 g of a 5-times diluted aqueous solution of the ink-jet ink and 50 g of purified water at a maximum absorption wavelength in a visible range.

21. An ink-jet ink according to claim 14, wherein the water-soluble organic compound comprises at least one compound selected from the group consisting of a polyalcohol having an amide bond; polyethylene glycol having a molecular weight of 200 to 300 or 1000; N, N'-bis-(2-hydroxyethyl)-urea; bishydroxyethyl sulfone; 1,2,6-hexanetriol; 1,5-pentanediol; 1,6-hexanediol; and trimethylolpropane.

* * * * *